United States Patent [19]

Ikenoue

[11] Patent Number: 5,131,078
[45] Date of Patent: Jul. 14, 1992

[54] PRINTER CONTROLLER

[75] Inventor: Yoshikazu Ikenoue, Osaka, Japan

[73] Assignee: Minolta Camera Kabushiki Kaisha, Osaka, Japan

[21] Appl. No.: 723,297

[22] Filed: Jun. 28, 1991

Related U.S. Application Data

[62] Division of Ser. No. 424,526, Oct. 19, 1989.

[30] Foreign Application Priority Data

| Oct. 21, 1988 | [JP] | Japan | 63-266758 |
| Oct. 21, 1988 | [JP] | Japan | 63-266759 |
| Oct. 21, 1988 | [JP] | Japan | 63-266760 |
| Oct. 21, 1988 | [JP] | Japan | 63-266761 |
| Nov. 12, 1988 | [JP] | Japan | 63-286358 |
| Nov. 12, 1988 | [JP] | Japan | 63-286359 |

[51] Int. Cl.$^5$ ............................................. G06K 15/00
[52] U.S. Cl. ...................................... 395/114; 395/112
[58] Field of Search ............... 364/519–520, 364/930 MS, 235 MS, 940.62; 400/61, 70, 76, 83; 358/405, 403, 402, 442, 470; 395/101, 112, 113, 114, 115

[56] References Cited

U.S. PATENT DOCUMENTS

| H696 | 10/1989 | Davidson | 364/519 |
| 3,903,507 | 9/1975 | Dillingham | 364/519 |
| 4,100,533 | 7/1978 | Napolitano et al. | 364/519 |
| 4,287,508 | 9/1981 | Arita et al. | 364/519 |
| 4,523,299 | 6/1985 | Donohue et al. | 364/519 |
| 4,525,806 | 6/1985 | Barnes et al. | 364/519 |
| 4,547,880 | 10/1985 | De Vita et al. | 364/519 |
| 4,667,321 | 5/1987 | Goodman | 364/519 |
| 4,754,428 | 6/1988 | Schultz et al. | 400/70 |
| 4,837,737 | 6/1989 | Watanabe | 364/900 |
| 4,866,671 | 9/1989 | Yokoyama | 364/519 |
| 5,047,957 | 9/1991 | Ikenoue | 364/519 |

FOREIGN PATENT DOCUMENTS 62-179241 8/1987 Japan ........................ 364/519

OTHER PUBLICATIONS

Instruction Manual of a Switching Unit "Chibi" of Model DEB-131 and DEB-134, Tokyo, Japan, Jan. 10, 1985 (with partial translation).

Primary Examiner—Arthur G. Evans
Attorney, Agent, or Firm—Burns, Doane, Swecker & Mathis

[57] ABSTRACT

A printer controller for controlling a printer shared with plural external data processors is disclosed.

The printer controller includes a first memory for memorizing control data received from either one of the data processors when connected, a second memory for saving the received control data when another data processor is connected and a memory controller for saving the control data from the first memory to the second memory and for returning the control data from the second memory to the first memory when the printer is switched from one of the data processors to another one or vice versa.

The printer controller further includes a communication device for controlling communication between either one of the data processors and the printer which is capable of identifying individual data processors.

8 Claims, 22 Drawing Sheets

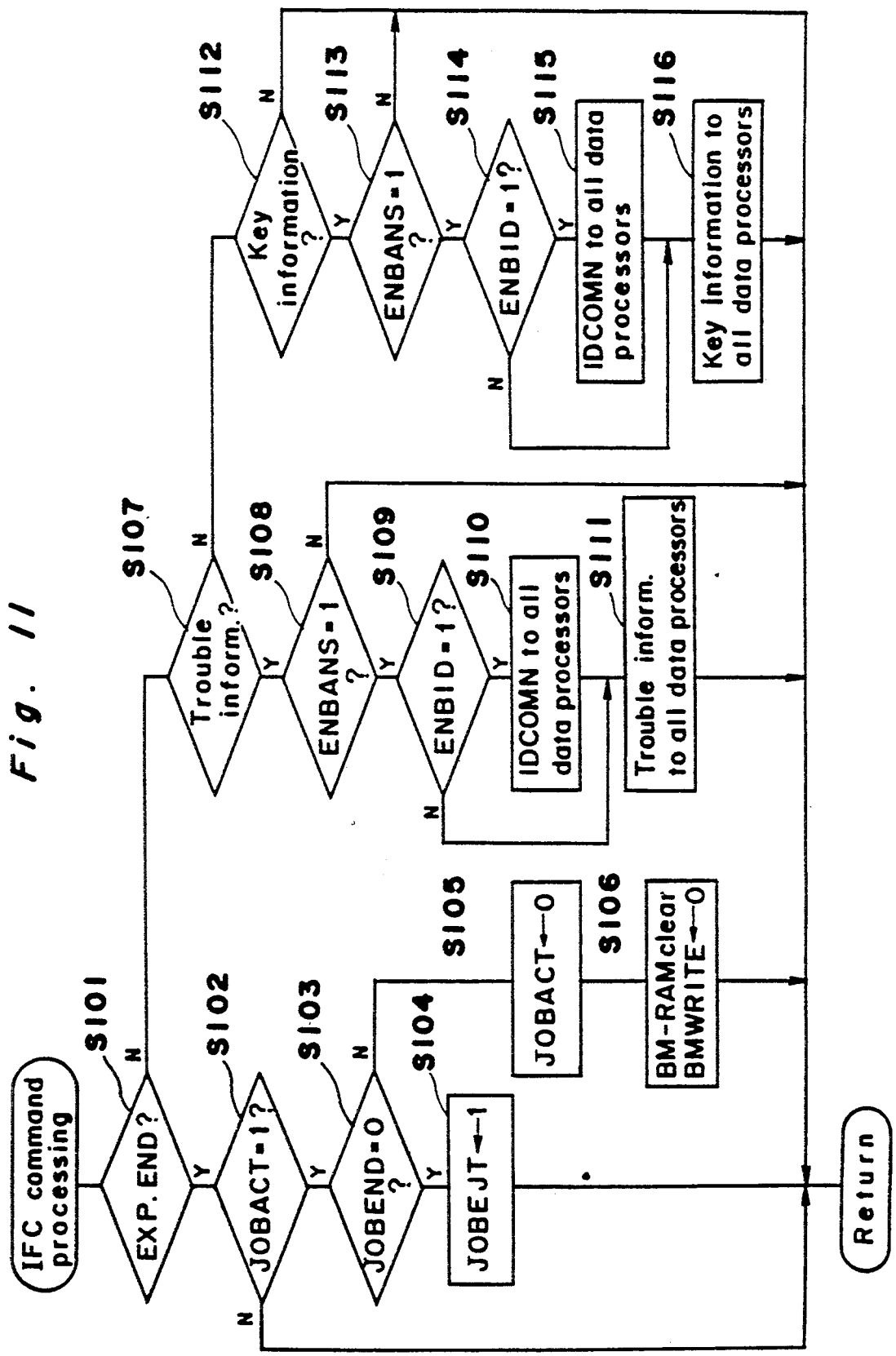

PRINTER CONTROLLER

This application is a divisional of application Ser. No. 07/424,526, Filed Oct. 19, 1989.

BACKGROUND OF THE INVENTION

1. Field of the Invention

The present invention relates to a controller for controlling a printer for printing out images responsive to data sent from a data processor such as a host computer, especially to a printer controller for controlling an electro-photographic printer such as a laser printer.

2. Description of Related Art

In general, information sent from a data processor is comprised of printing data indicating real image patterns to be printed and control data for controlling the printing method and the mode of a printing engine of the printer. The printer controller processes these data to transform them to dot images to be printed and transmits them to the print engine in order to print out these dot images thereby.

Recently, electro-photographic printers such as laser printers have been widely used because of a high speed of print, an excellent quality of print and quiet printing action.

However, they are still expensive and, therefore, a few data processors share one printer with each other usually. In such case, it becomes necessary to switch respective data processors to the common printer by a suitable switching means such as a multiplexer upon printing.

Since the printer has only one memory for memorizing information related to the print mode such as a number of copies, a size of copy paper, margins and a font of print, the print mode after switching from one user to another may be subjected to the latest print mode before switching. Alternatively, the print mode information before switching is destroyed by designating another print mode when the printing operation is interrupted by another user during an interval thereof.

Conventionally, in order to solve these problems, data of an initial setting file is sent before transmission of print data to initialize the printer whenever the switching is done. However, the initialization of the printer by the initial setting file is very complicated because items to be set become many in a multi-functioned printer. It is also possible by restarting the printer. However, in this case, it can be done only after the completion of the present printing operation and is inconvenient for a remote user since it is difficult to confirm active and inactive states of the printer.

In order to solve the latter problem, it may be considered that a state code indicating the present state of the printer is sent back from the printer to the main host-machine and the main host-machine sents the state code to individual terminals (users). However, the conventional printer is not designed for taking into consideration common use and, accordingly, it is impossible for the multiplexer or the main host to discriminate which terminal the state code is to be sent.

SUMMARY OF THE INVENTION

One of objects of the present invention is to provide a printer controller capable of preventing mode information of individual users from being destroyed or altered even if the printer is shared by plural users.

Another object is to provide a printer controller capable of responding with the present state of the printer to suitable users or data processors if the printer is shared with plural users or data processors.

A further object of the present invention is to provide a printer controller through which bi-directional communication can be made between one of plural data processors and a printer shared with them.

One more object of the present invention is to provide a printer controller capable of identifying each of plural data processors sharing a printer with each other and setting the printer mode corresponding to a new data processor when switched from an old one.

A further object of the present invention is to provide a printer controller capable of informing respective data processors of problems in a printer shared with plural data processors.

BRIEF DESCRIPTION OF THE DRAWINGS

These and other objects and features of the present invention will become clear from the following description taken in conjunction with the preferred embodiment thereof with reference to the accompanying drawings, in which:

FIG. 11 is a flow chart of the IFC command processing subroutine to be executed in the main routine;

DETAILED DESCRIPTION OF THE PREFERRED EMBODIMENT (a) Composition of Electro-photographic printer First, the compositions of a printer and a printer controller according to the present invention are explained.

Figure 1:
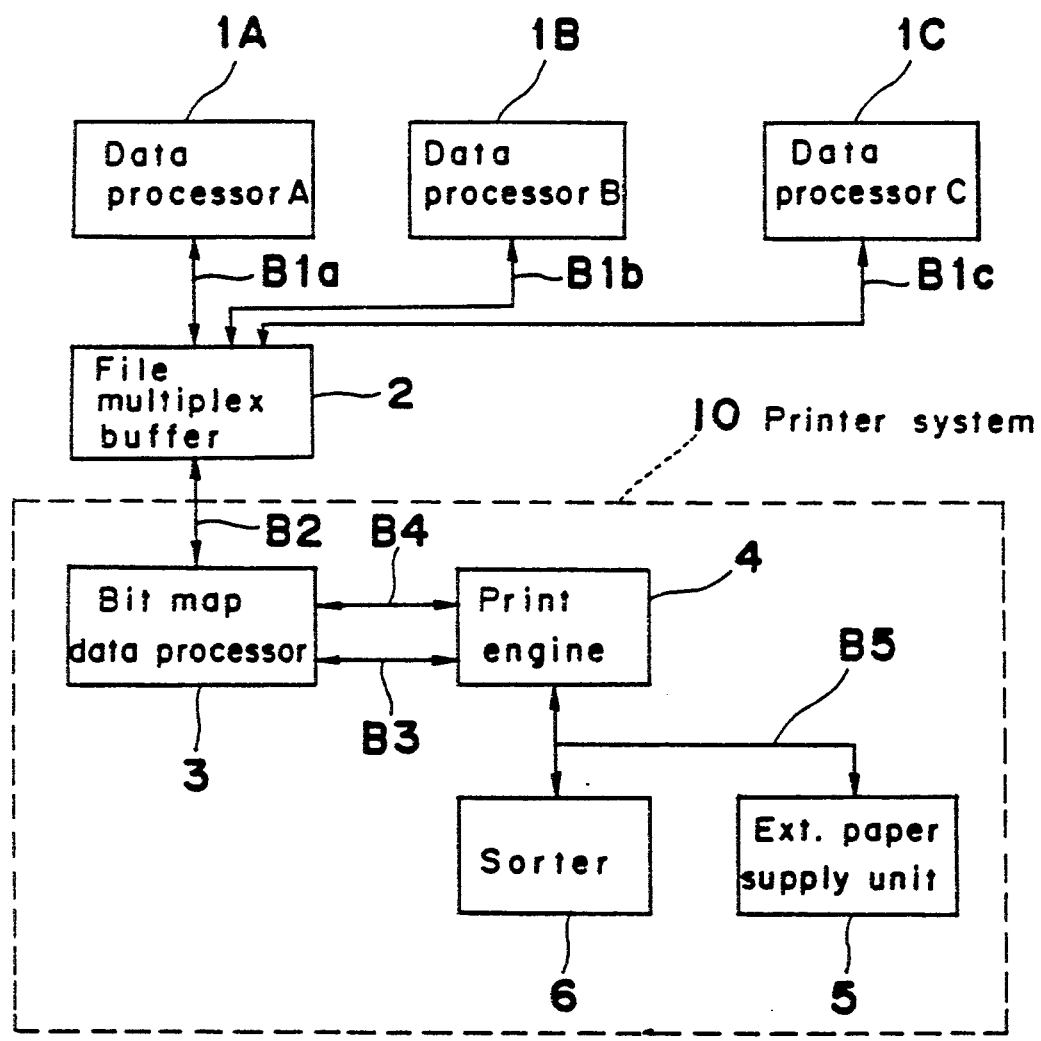
FIG. 1 is a block diagram for showing a printing system to which the present invention is applied.

FIG. 1 shows a printing system including a printer 10 according to the preferred embodiment of the present invention and plural data processors.

Data sent from any one of three data processors 1A, 1B and 1C are once stored in an external file-multiplex-buffer 2 and the data stored in said buffer 2 are outputted therefrom to the printer 10. The file-multiplex-buffer 2 also has a function as a multiplexer for connecting either one of three data processors to the printer 10.

The printer 10 is comprised of a data processor 3 of bit map type, a print engine 4 for printing images using a laser means and an electro-photographic processor (not shown) and accessaries such as external paper supplying unit 5, sorter 6 and the like.

Figure 2:
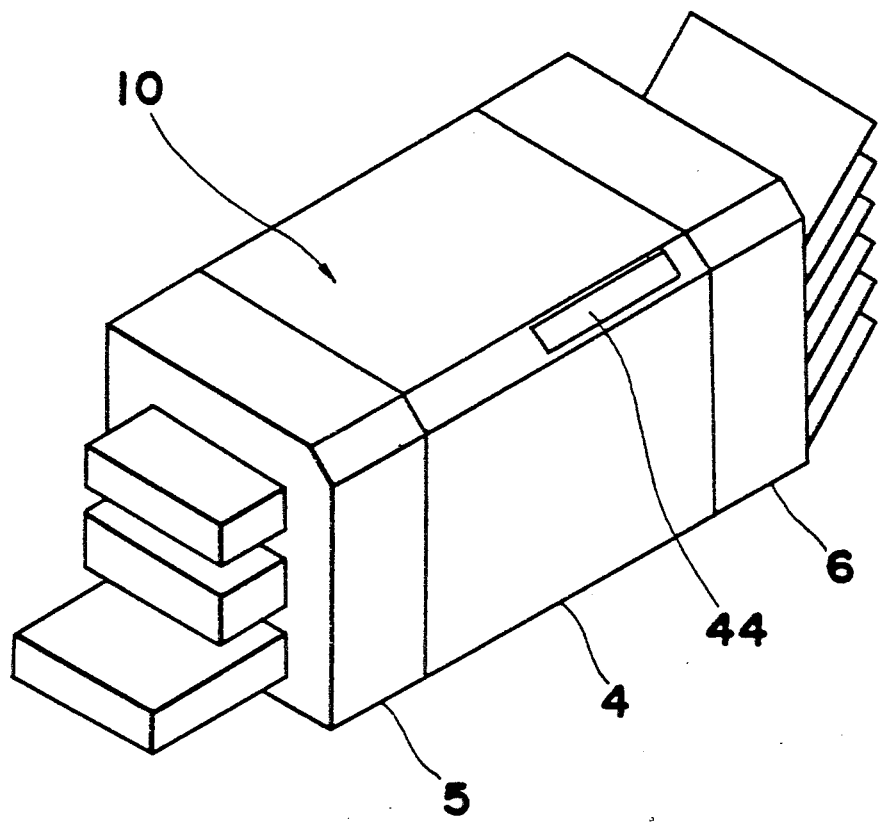
FIG. 2 is a perspective view of the printer.

FIG. 2 shows an appearance of the printer 10. The print engine 4 installs the data processor 3 of bit map type therein, and the external paper supplying unit 5 and the sorter 6 are optionally mounted on the print engine 4. Further, an operation panel 44 is provided on the upper front surface of the print engine 4.

Figure 3:
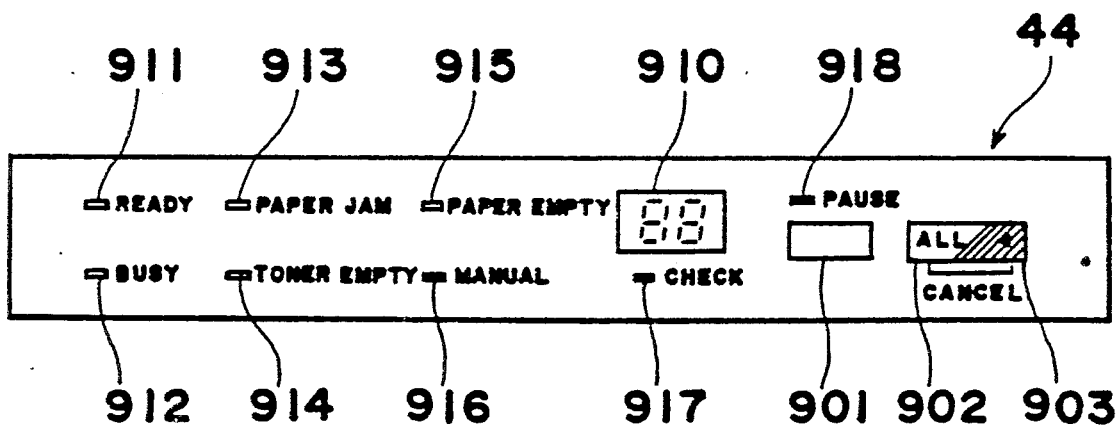
FIG. 3 is a plan view of an operation panel of the printer.

FIG. 3 shows a plan view of the operation panel 44 having three entry keys 901, 902 and 903 and eight displaying devices 910 to 918. The key 901 is a PAUSE key for stopping the printing action temporally and the key 903 is a SHIFT key and becomes a CANCEL key for suspending the printing action when it is pushed together with the key 902. The reason why the CANCEL key is comprised of two keys 902 and 903 is to avoid a suspension due to careless operation.

Figure 4:
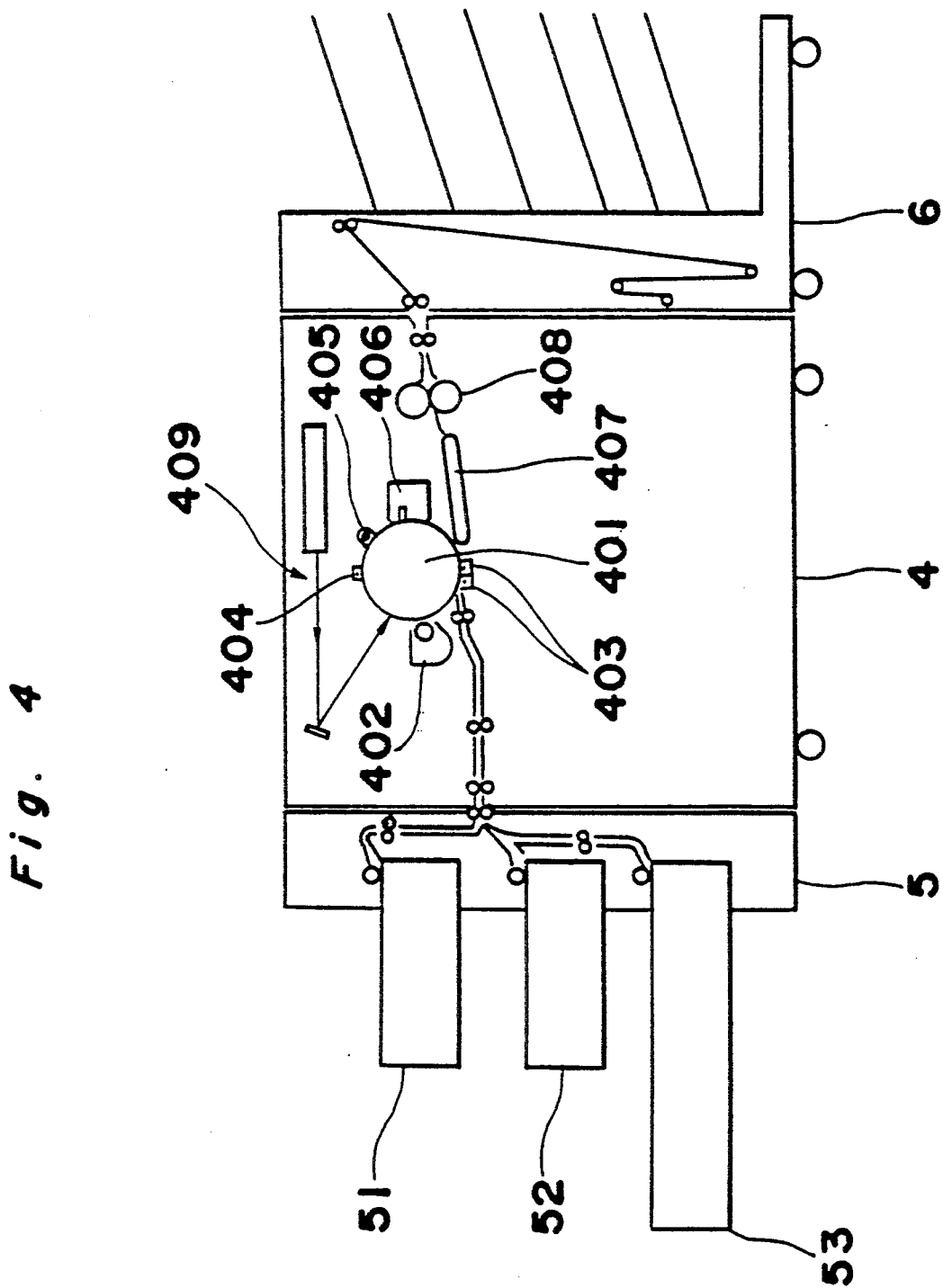
FIG. 4 is a schematic sectional view of the printer.

FIG. 4 is a schematic central sectional view of the printer for showing passages provided for feeding copy papers each of which is selectively supplied from any one of three cassettes 51, 52 and 53 detachably mounted on the body of the printer 10.

There are arranged around a photoconductive drum 401, a cleaner 406 for removing residual toner, an electrifying charger 404 for electrifying the drum 401, and an eraser lamp 405 for erasing unnecessary latent images.

The drum 401 is exposed by a laser beam emitted from an optical system 409 including laser means to form a latent image thereon. The latent image is developed by a developing means 402 using toner and the developed toner image on the drum 401 is transferred onto a copy paper by a transfer charger 403. The copy paper on which the toner image has been transferred is fed by a conveyer belt 407 to a fixing device 408 and then, is discharged on a tray of the sorter 6.

Figure 5:
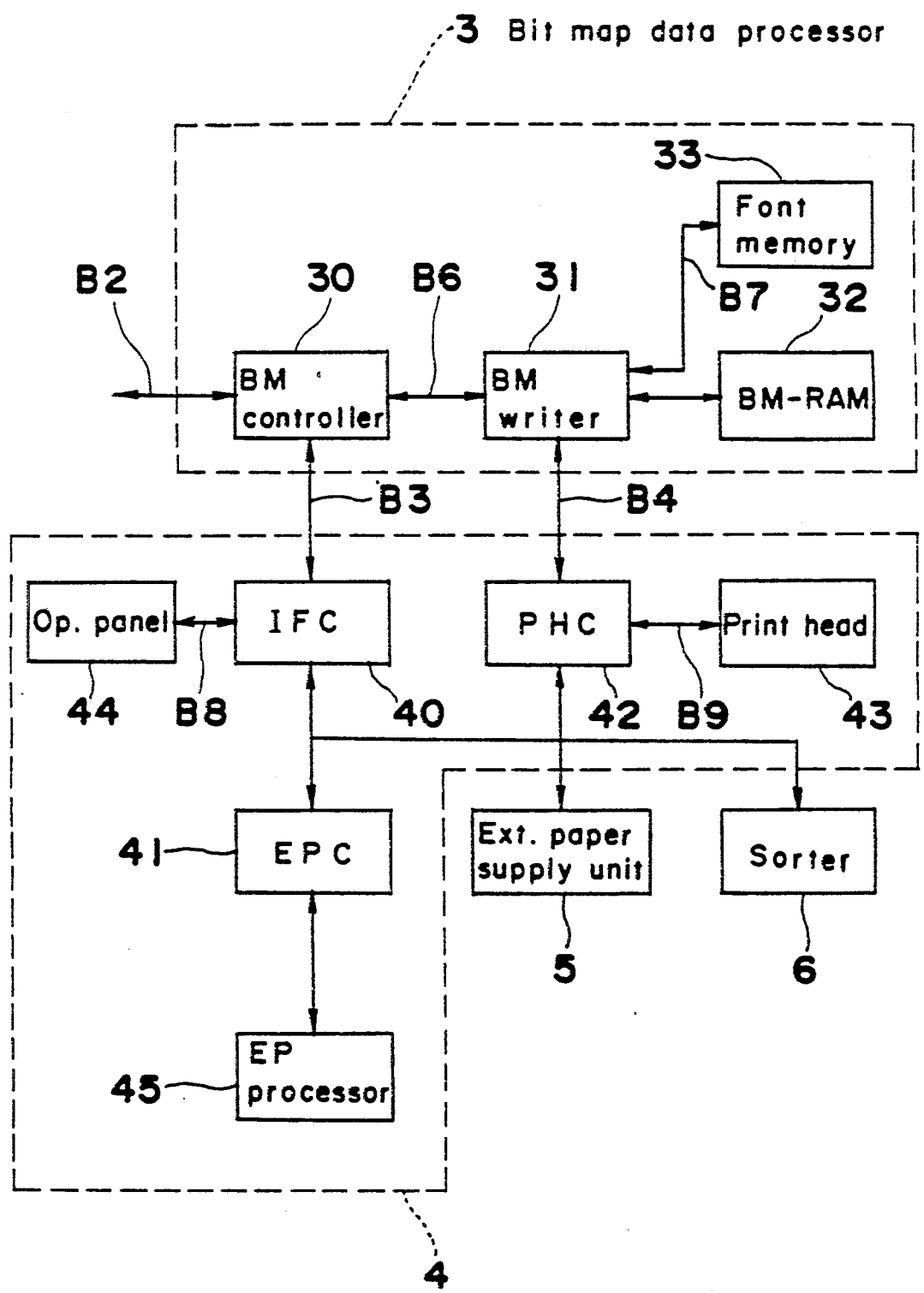
FIG. 5 is a block diagram showing a bit map data processor and a printer according to the preferred embodiment of the present invention.

FIG. 5 is a block diagram of the printer system.

The data processor 3 of bit map type is comprised of a bit map controller (BMC) 30, a bit map RAM (BM-RAM) 32, a bit map writer (BMW) 31 and a font memory 33. The font memory 33 has a ROM section wherein predetermined font data are memorized and a RAM section for storing font data downloaded from an external apparatus such as the host machine. The communication between the data processor 3 and the print engine 4 is done through a bus B3 provided for control data (the number of copies, accessary control codes and the like) and a bus B4 provided for image data.

The print engine 4 is substantially comprised of three controllers 40, 41 and 42. The controller 40 is an interface controller (IFC) which executes processing of control data from the bit map controller 30, control for the operation panel 44 and timing control for the whole printer including the external paper supplying unit 5 and the sorter 6.

The controller 41 is an electro-photographic process controller provided for controlling an electro-photographic controller 45 responsive to data sent from the interface controller 40 through an internal bus.

The controller 42 is a print head controller 42 provided for controlling light emission of a semiconductor laser and rotation of a polygon motor in a print head 43 according to information sent from the interface controller 40 through the internal bus in order to write image data sent from the bit map writer 31 through the internal bus B4 on the photoconductive drum 401.

The external paper supplying unit 5 and the sorter 6 are also controlled by the interface controller 40 through the internal bus.

As is apparent from the above mentioned, the printer 10 according to the preferred embodiment is a laser printer of bit map type. Print data (most of them are represented as codes) sent from either one of the data processors 1A, 1B and 1C are developed as actual print images on the BM-RAM 32 of the data processor 3 and these developed print images are outputted to the print engine 4. The print engine 4 modulates the laser beam according to data sent from the data processor 3 of bit map type to record images on the photoconductive drum and these images are transferred to a print paper.

As stated above, data sent from the data processors 1A, 1B and 1C include control codes for document format and codes for setting a mode of the print engine other than print data.

The data processor 3 of bit map type analyzes not only the print data but also these protocol data and outputs control commands for the document format and indications such as command for allowing a print paper to pass to the print engine 4, mode altering commands regarding the accessaries and the like, if necessary.

In the print engine 4, the control for the electro-photographic processor, timing control for the print papers and further processing synchronized with the timing of pass of print paper to another optional accessary are done other than the control of record mentioned above. The control for the print engine is substantially similar to that of an electro-photographic copying machine except for the optical scanning system.

(b) Bit map controller

Figure 6:
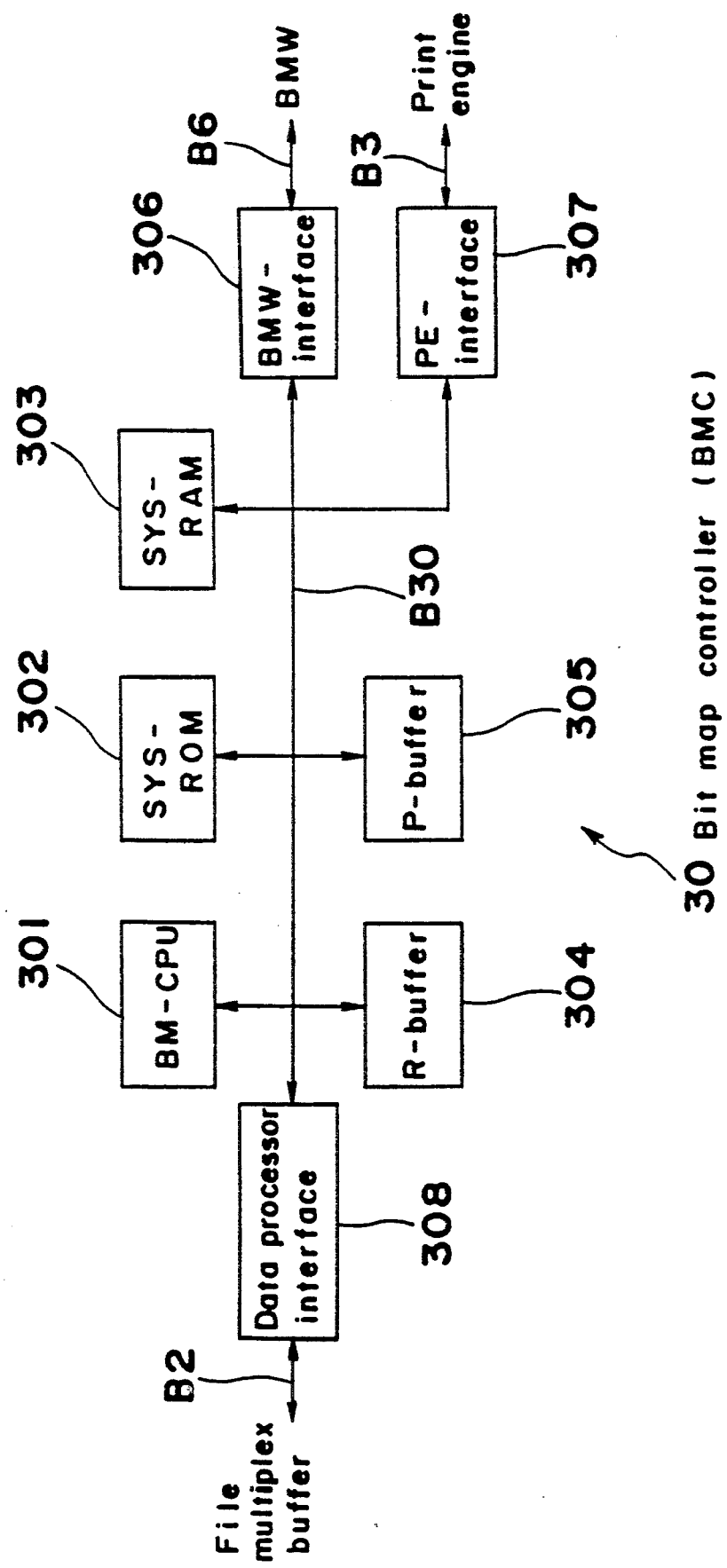
FIG. 6 is a block diagram of a bit map controller according to the preferred embodiment of the present invention.

FIG. 6 shows a block diagram of the bit map controller 30. It is comprised of plural blocks connected by an internal bus B30. A BM-CPU 301 forms a main part of the data processor 3 of bit map type, which communicates with either one of the external data processor 1A, 1B and 1C and/or the file-multiplex-buffer 2 through a data processor interface 308, transforms print data, controls the bit map writer 31 through a BMW interface 306 and controls the print engine through a print engine interface 307. SYS-ROM 302 stores programs for the BM-CPU 301. SYS-RAM 303 is a working memory area for the BM-CPU 301 which is used for memorizing stacks and fundamental flags.

R-buffer 304 is a communication buffer for communicating with external apparatuses such as data processors 1A, 1B and 1C and the file-multiplex-buffer which is provided for enabling to process the programs of the BM-CPU 301 and the communication with the data processors in an asynchronous manner.

A packet buffer (P-buffer) 305 is provided for memorizing data from any one of the data processors 1A, 1B and 1C as intermediate codes (hereinafter, referred to as packets) which are transformed from the data based on attributes of the font so that imaging to the BM-RAM 32 may be made easily.

It is necessary to calculate parameters such as addresses of individual font patterns in the font memory and addresses of the BM-RAM 32 for individual font patterns to be imaged in order to make the bit map writer 31 image actual font patterns. In order for that, it takes a predetermined time. Accordingly, speed-up of the data processing can be obtained by processing data of the next page before printing data is imaged on the BM-RAM 32. In order for that, the P-buffer 305 is comprised of an FIFO (first in / first out) buffer.

The print engine interface 307 is an interface between the bit map controller 30 and the print engine and communicates JOB control commands such as print command and the like through an interface of the print engine 4 and a bus B3.

(c) Flows for bit map control

Actions of the present system will be explained referring to flow charts.

Figure 9:
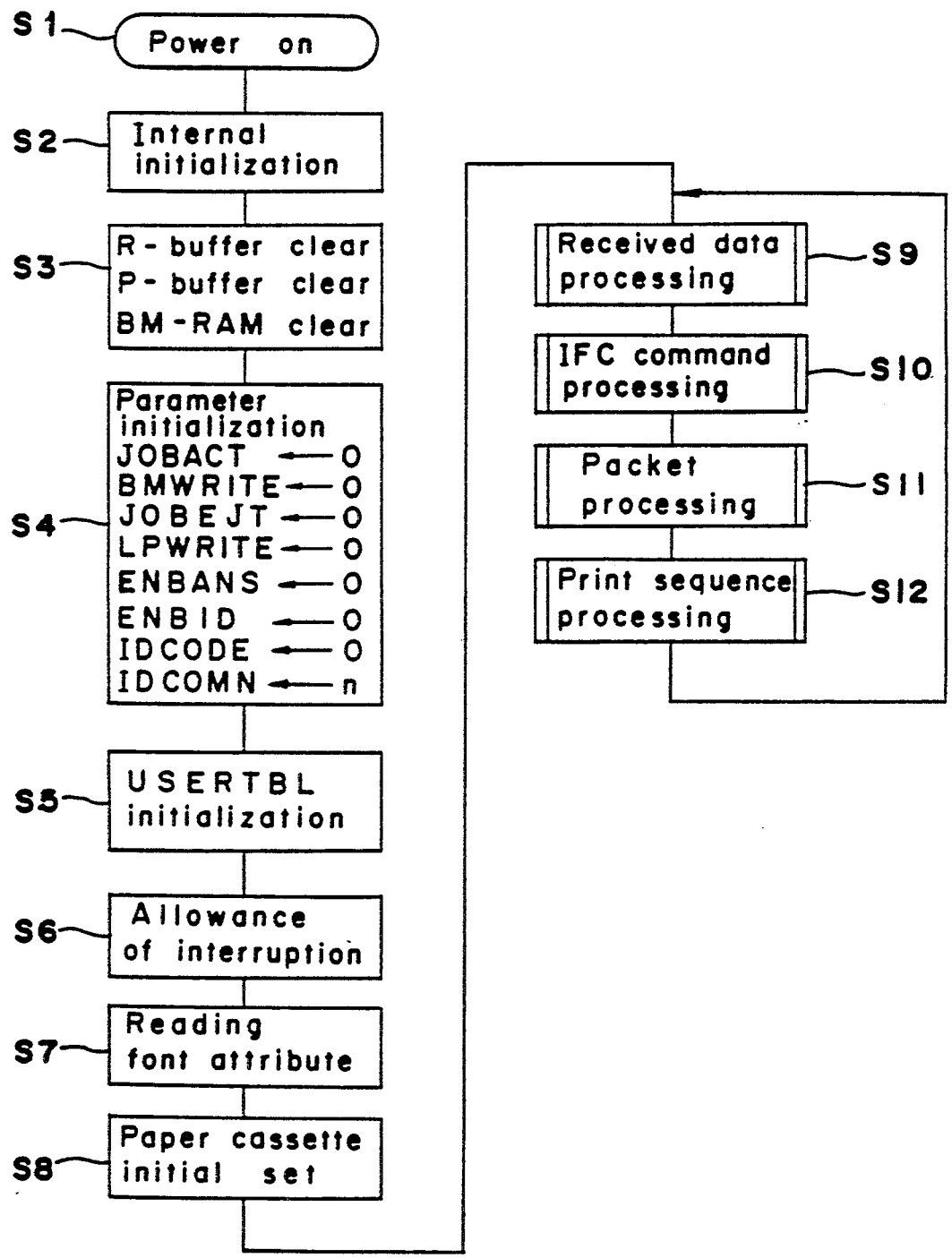
FIG. 9 is a flow chart of a main routine to be executed by the bit map data processor.

FIG. 9 is a flow chart showing the main routine to be executed by the printer controller 30.

When the power source is switched on at step S1, the printer is initialized at step S2 and the R-buffer 304, the P-buffer 305 and the BM-RAM 32 are cleared at step S3. Then, parameters are initialized at step S4.

Functions of these parameters are as follows;

JOBACT: indicates a printing state to certain page (namely, the printing operation of a designated number of prints has not yet completed).

BMWRITE: indicates whether or not any data has been written into the BM-RAM 32.

JOBEJT: indicates a request command for print start.

LPWRITE: indicates start of pre-edition of page data.

ENBANS: indicates that message transmission to the data processor is to be allowed.

ENBID: indicates to add an ID code to a message to the data processor.

IDCODE: indicates a value set for respective ID code.

IDCOMN: indicates a value set for COMMON code (n is a predetermined constant).

The IDCODE indicates a message directed to a specific data processor and the IDCOMN indicates a message common to all data processors. The latter is used to indicate a fatal problem at the printer side such as a toner empty.

Figure 7:
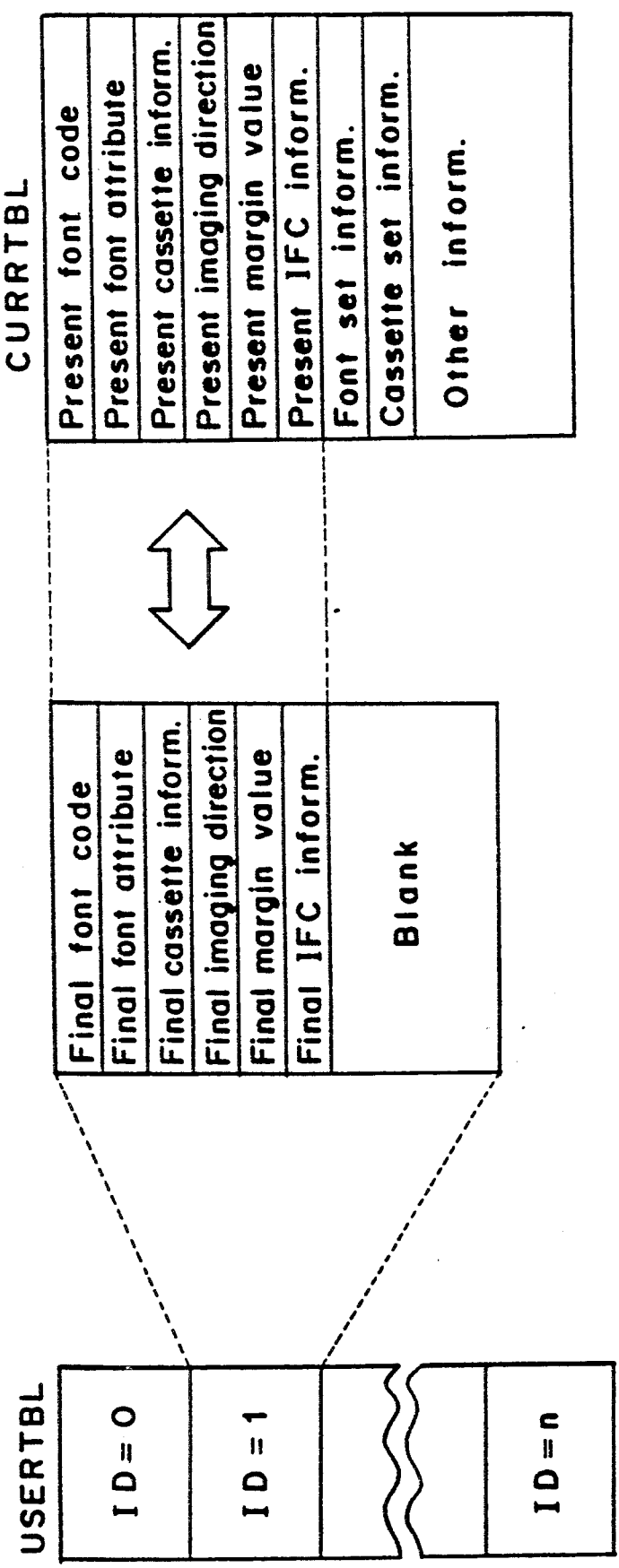
FIG. 7 is an explanative view for showing contents of tables USERTBL and CURRTBL.

Further, a user table (hereinafter, referred to as USERTBL) is initialized at step S5. The USERTBL is provided for saving various set values of the printer for every user's IDCODE and contents thereof are schematically shown in FIG. 7. The USERTBL is an area only for saving these set values and the contents thereof are transferred to a CURRTBL upon using them actually. This is intended to speed up the data processing by omitting complicated calculations such as address transformation and the like. In the present preferred embodiment, the USERTBL is provided in the SYS-RAM 303 and is desirably backed up by a battery even if the power source of the printer is turned off.

Information about each mounted font in the CURRTBL is read into upon switching on the power source but information about each mounted cassette is renewed by an interrupt routine (not shown) according to information sent from the IFC 40 if the state of the cassette is changed.

Figure 8:
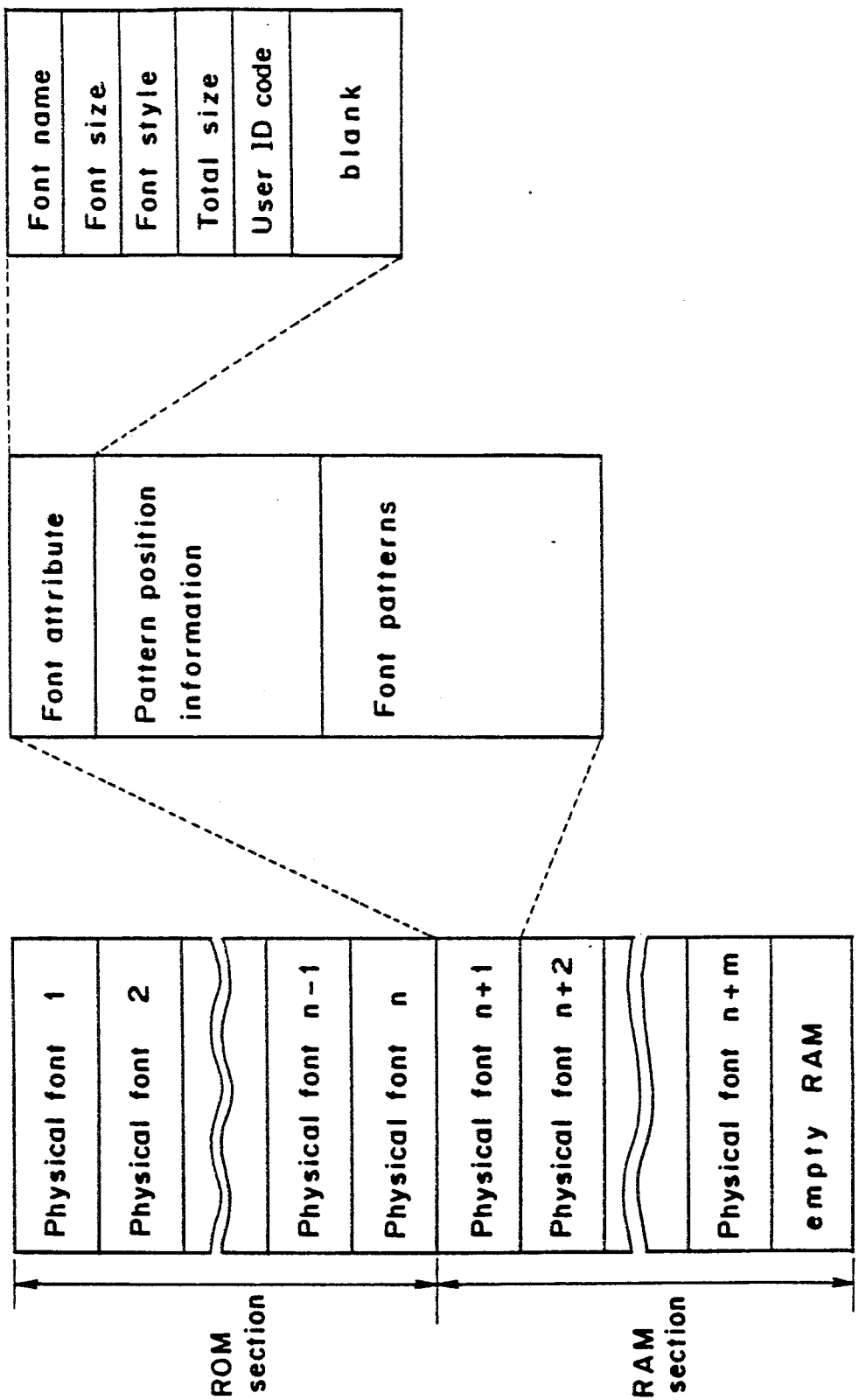
FIG. 8 is an explanative view showing a composition of a font memory according to the preferred embodiment of the present invention.

FIG. 8 shows a data construction of the font memory.

The font memory is divided into ROM section and RAM section and the latter stores a set of font patterns (a font) down-loaded from an external data processor. Each font is comprised of a font attribute, address information of individual font patterns and actual font patterns.

The font attribute includes font name, font size, font style and total size. As shown in FIG. 8, with respect to the font stored in the RAM section, there is provided an area for memorizing an IDCODE for a user.

Returning to FIG. 9, at step S6, it is allowed to access interruption programs and, at step S7, attributes of the font to be used for editing printing data are used in order to memorize them in the SYS-RAM 303 as information about the mounted font. Then, initial setting for the paper supplying cassette is performed at step S8 and, thereafter, the process enters into an actual processing loop for performing subroutines S9 to S12.

The actual processing loop is classified into four processings as follows;

Received data processing (S9) in which processing for data received from the data processor and transformation of them to packets is executed.

IFC command processing (S10) in which data from the print engine 4 are processed.

Packet processing (S11) in which processing for imaging print data on the BM-RAM 32 is executed.

Print sequence processing (S12) in which processing for print sequence related to the IFC 40 is executed.

Data from either one of the external data processors are stored once in the R-buffer 304 as a receiving buffer by an interruption processing for receiving data in order to improve the through-put in the communication.

Received data are read out from the R-buffer 304 in order to transform them into packets by the received data processing subroutine (S9) and packets are stored once in the P-buffer 305. Thereafter, in the packet processing (S11) each packet is read out therefrom and a font pattern corresponding to each packet is imaged on the BM-RAM 32 by the bit map writer 31.

Figure 15:
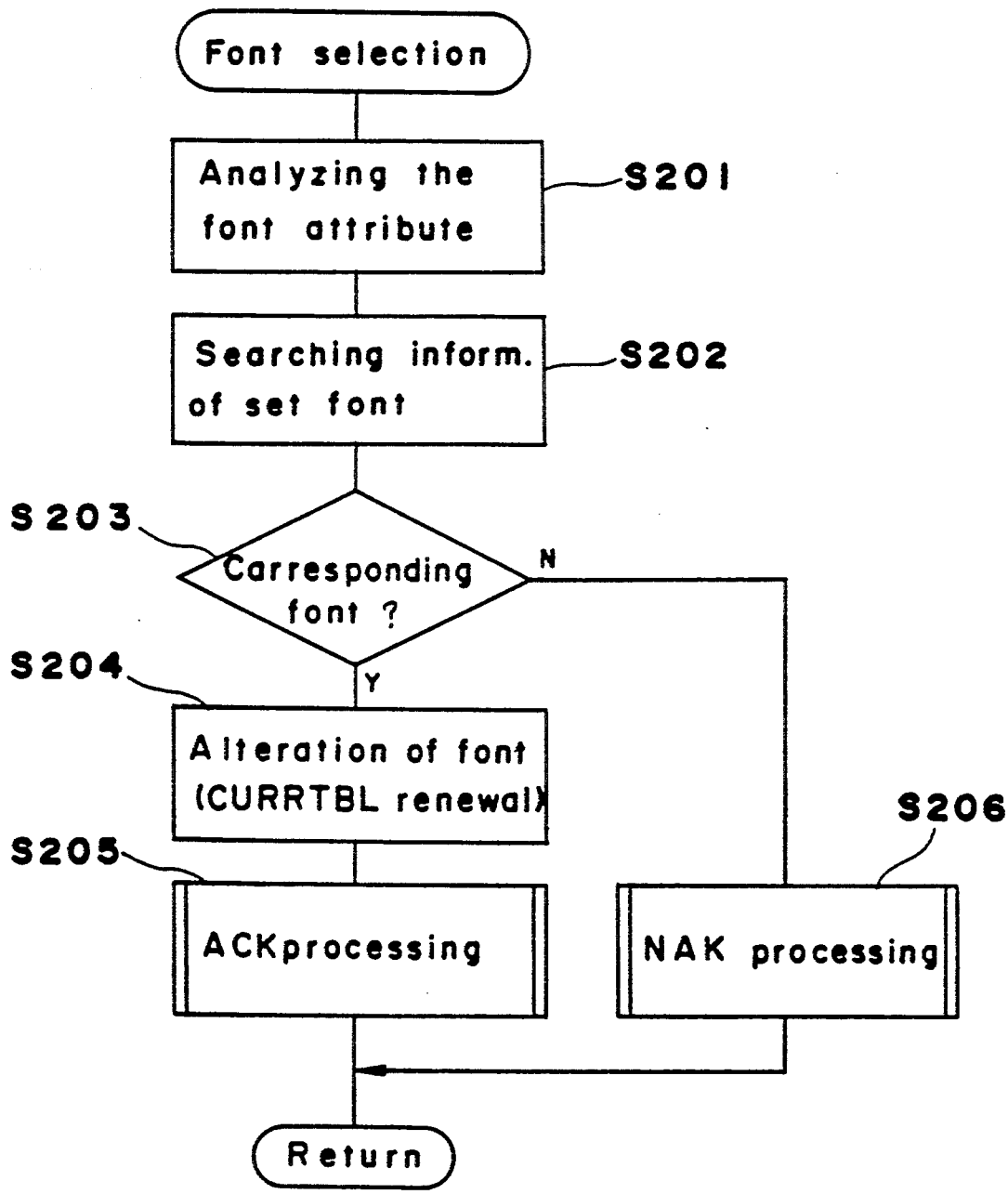
FIG. 15 is a flow chart of the font selection subroutine to be executed in the subroutine shown in FIG. 10(a)

When a print request code (PAGE EJECT) is detected, an actual printing operation is started by the print sequence processing (See FIG. 15).

Received data processing

Figure 10A:
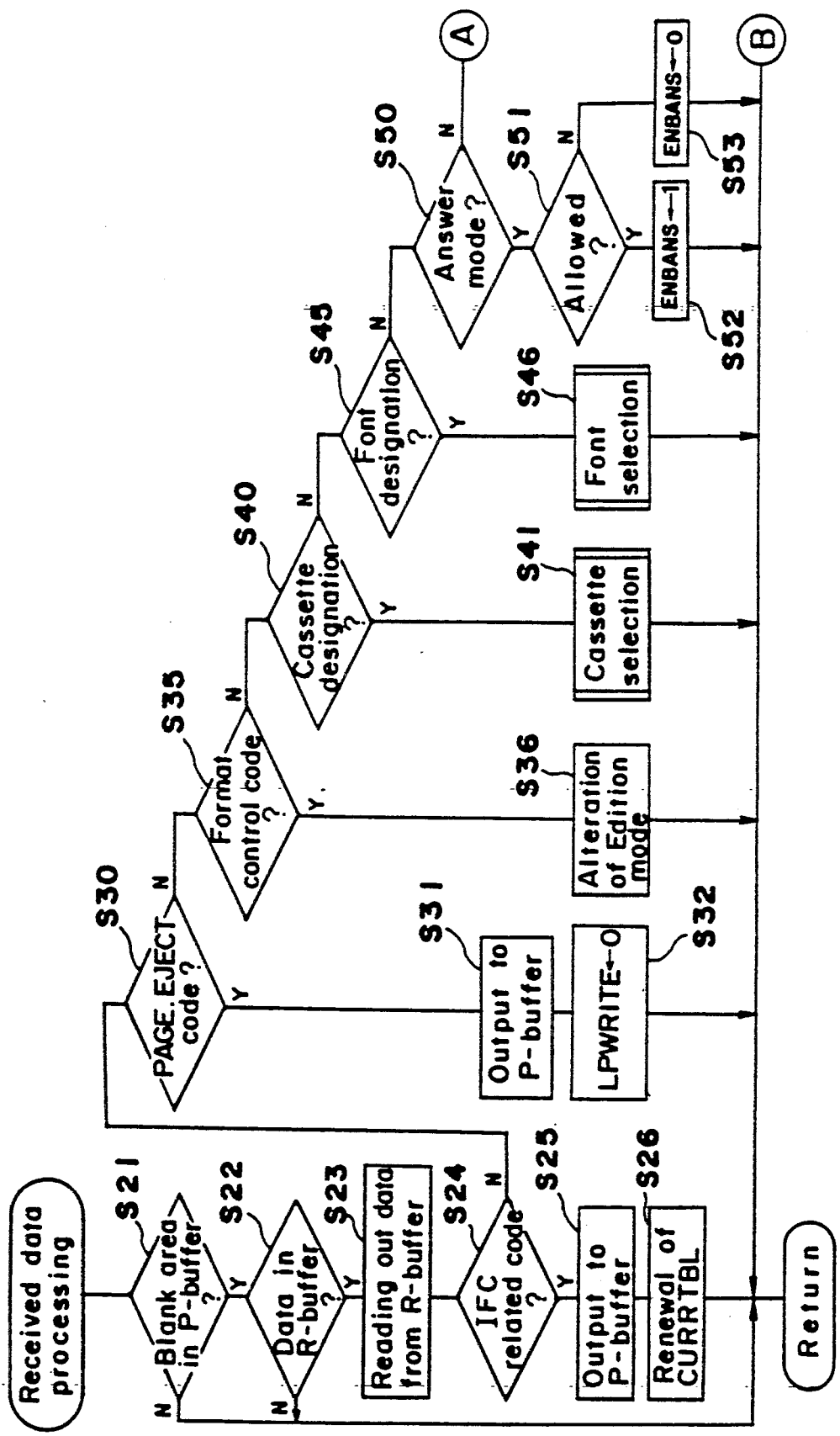
FIGS. 10(a) and 10(b) are a flow chart of the received data processing subroutine to be executed in the main routine.
Figure 10B:
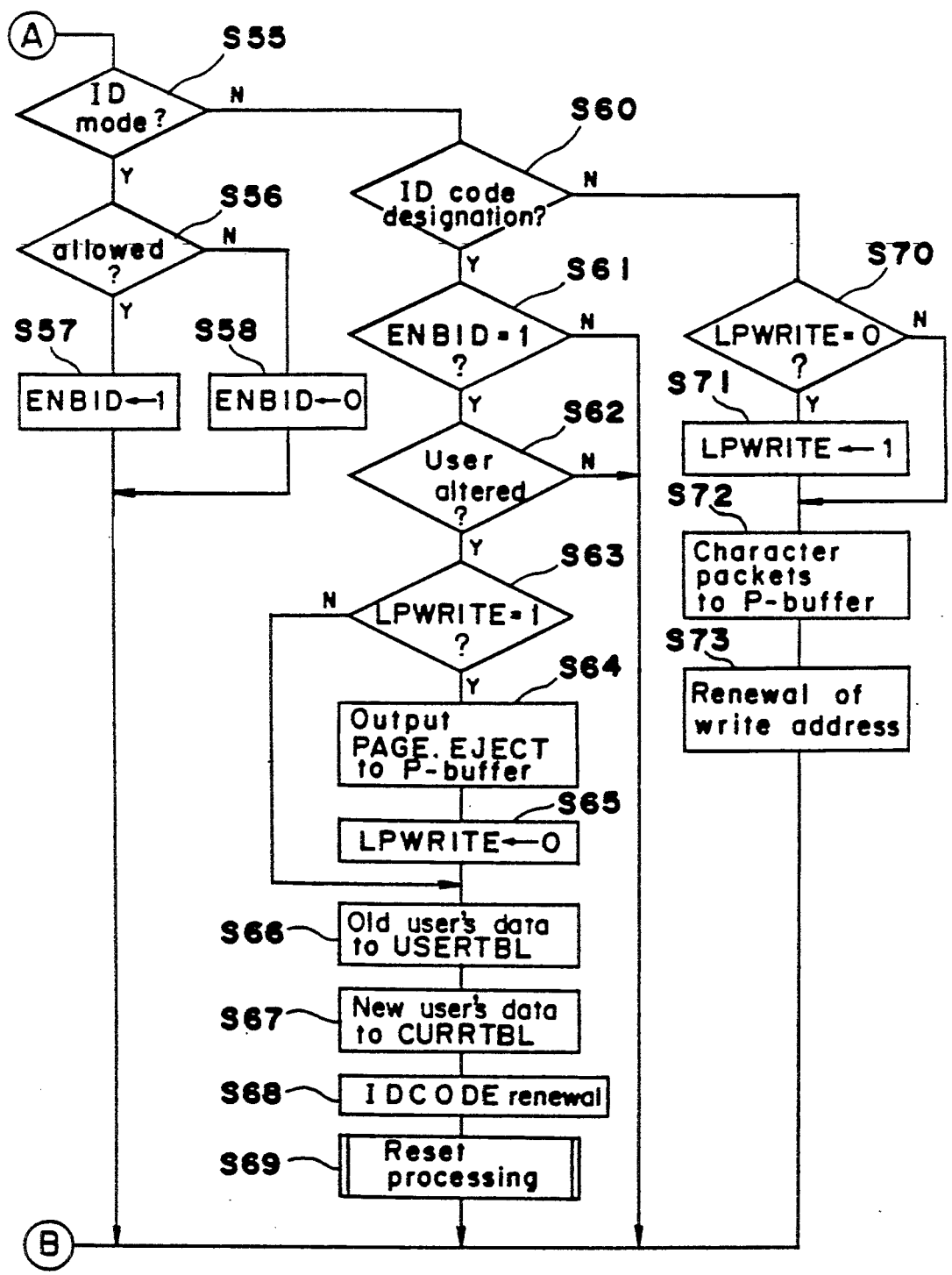

FIGS. 10(a) and 10(b) show a flow chart of the subroutine for the received data processing.

At first, it is checked at step S21 whether or not a vacant area is in the P-buffer 305 and, if there is a vacant area therein and if it is checked that any data is received at step S22, the processing is continued.

If the received data is a character code to be printed (at steps S70 to S73), it is transformed into a packet according to the present font code on the CURRTBL (See FIG. 7) and the font attribute read upon switching on the power source at step S72. In this transforming process, a font address of a pattern corresponding to the character code is outputted to the P-buffer 305 at first, then a write address to the BM-RAM 32 is outputted to the P-buffer 35 and the write mode is outputted to the bit map writer 31. Thereafter, the write address of the next font pattern onto the BM-RAM 32 is renewed according to the size of the present font pattern at step S73. The format of a result of print is finally determined by this processing. Since this is different from the actual imaging to the BM-RAM 32, this is considered to be a kind of virtual edition. Further, upon imaging the first character of a page (YES at S70), LPWRITE flag indicating the start of the virtual edition is set at one at step S71.

If the read packet is an IFC related code for setting a number of prints, switching between paper supplying cassettes, an action of an option or the like (YES at step S24), a packet of a type different from that of the character is outputted to the P-buffer in order to execute the packet processing (S11) of the character synchronize at step S25. Further, the CURRTBL is renewed at step S26.

If the read code is PAGE.EJECT code which indicates the end of data of one page (NO at step S24 and YES at step S30), the printing action is started when the last character has been imaged on the BM-RAM 32 since it has a role of a print start code in the packet processing. This code is also outputted to the P-buffer 305 at step S31 in order to synchronize the processing with characters existing before and after thereof. Thereafter, the LPWRITE flag is reset in order to prepare the virtual edition of the next page at step S32.

If the read code is a format control code (YES at step S35), according to the kind of the format control code, the write address to the BM-RAM 32 is altered or the CURRTBL is altered in the case of alteration of the margin etc. at step S36.

Figure 14:
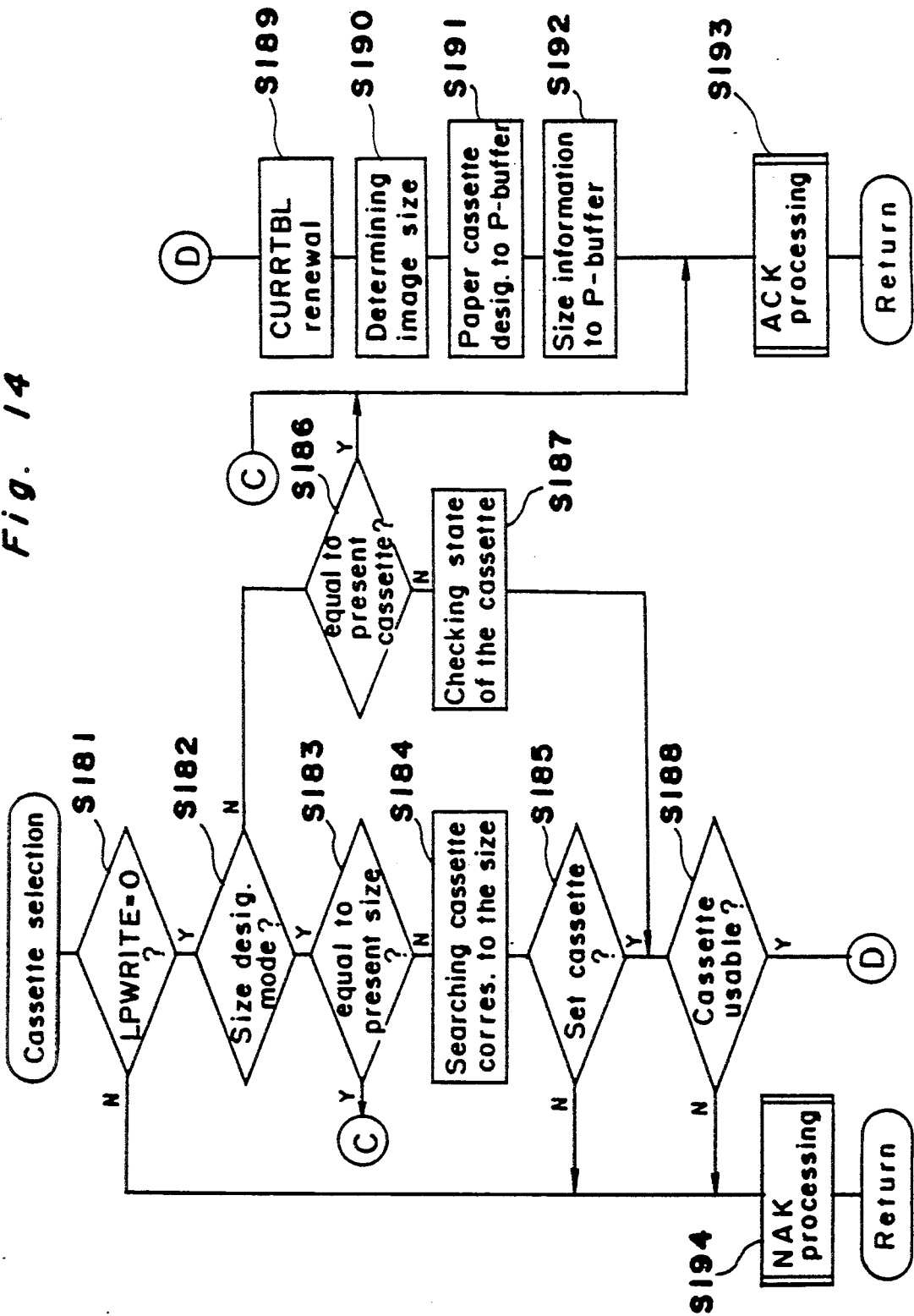
FIG. 14 is a flow chart of the cassette selection subroutine to be executed in the subroutine shown in FIG. 10(a)

If the read code is a designation code of cassette (YES at step S40), a cassette is selected responsive to the designation code of cassette at step S41 (See FIG. 14).

If the read code is a designation code of font (YES at step S45), a font is selected responsive to the designation code of font at step S46 (See FIG. 15).

Steps from S50 to S53 are provided for setting an answer mode informing respective data processors of a state of prosecution of the printer system 10. If the read code is a designation code of the answer mode for informing respective data processors of the state of prosecution (YES at step S50) and if the answer mode is a designation of allowance at step S51, ENBANS flag for allowing the transmission of a message to respective data processors is set at one at step S52.

If it is not a designation of allowance (NO at step S51), the ENBANS flag is reset at step S53.

If the ENBANS flag is set, the answer mode is set. In this mode, the BM-CPU 30 decides the state of the printer, for instance an error state such as paper jam and outputts a code or a message responsive to the state of the printer to individual external data processors through the data processor interface 308.

Processing by steps from S55 to S69 relates to the processing for ID codes of users sharing one printer system 10 with each other.

If the read code is a code for designating an ID mode using ID codes (YES at step S55) and if it indicates allowance of the ID mode (YES at step S56), ENBID flag indicating an entry of the ID mode is set at step S57. If it is not, the ENBID flag is reset at step S58. If both ID mode and answer mode are designated, ID codes are added to respective messages to the external data processors. Further, parameters such as editorial conditions are managed for every user.

Processing by steps from S60 to S69 relates to the setting of ID codes and alteration of parameters responsive to the ID code having been set.

When an ID code is designated at step S60 and if the ID mode is not allowed (NO at step S60) or the user is not altered (NO at step S62) although the ID mode is allowed (YES at step (S61), the ID code is neglected. If the user is altered and if data of the latest user are in the pre-editorial state (LPWRITE=1 at step S63), PAGE. EJECT code is outputted to the P-buffer 305 to print out them forcibly at step S64 and, thereafter, the LPWRITE flag is reset at step S63. This processing prevents the pre-edited data from adhering to the top page of the altered user. Respective parameters of the latest user are saved into the CURRTBL irrespective to whether or not data of the latest user are in the pre-editional state at step S66 and, thereafter, the parameters of the altered user are transferred back to the CURRTBL from the USERTBL corresponding to the ID code at step S67 and the IDCODE is altered at step S68.

Thereafter, a setting process is done at step S69 in order to set the print engine 10 for the altered user.

IFC command processing

FIG. 11 shows a flow chart of the processing about commands sent from the interface controller (IFC) 40.

EXP.END command is provided for indicating completion of an exposure by the laser beam regarding one page in order to synchronize the interface controller (IFC) 40 with the sequence of print.

If the IFC command is an EXP.END command (YES at step S101), the JOBACT flag is checked at step S102. If it is not set at one (NO at step S102), the process directly returns. If it is set (YES at step S102), the process goes to step S103. In the case of multi-print for the same image, the BMC 30 sets the next print start flag at step S104 (JOBACT←1). If the JOBEND flag indicating the end of print is set at one (NO at step S103), the JOBACT flag indicating the state of print is reset at step S105 and, thereafter, the BM-RAM 32 is cleared and the BMWRITE indicating the imaging state onto the BM-RAM 32 is reset at step S106 in order to prepare the next imaging operation. As stated above, decisions of two kinds are done according to the JOBEND flag of the EXP.END command at step S103. This is because the control with respect to the number of prints such as the multi-print is done by the interface controller 40.

On the contrary to the above, if the command is a command for indicating trouble information regarding the printer (YES at step S107), the IDCOMN code as a common code is added to the message indicating the trouble information at step S110 provided that the message transmission to the external data processors (YES at step S108) and that the mode for adding an ID code is set (YES at step S109; ENBID=1). The message with the IDCOMN is transmitted to all data processors at step S111.

If the message transmission to the data processors is not allowed (NO at step S108), the process returns without transmitting the message.

When one of keys on the operation panel 44 such as PAUSE key 901 or CANCEL key 902 and 903 is operated and, thereby, the printing action is suspended, information regarding the operated key is transmitted to all data processors after adding the IDCOMN thereto, similarly to the case of the trouble information (steps from S112 to S116).

It is desirable to inform all users of the trouble information or the key information since release operation of the trouble or the key operation is impossible from the terminal side and must be done directly to the printer.

Packet processing

Figure 12:
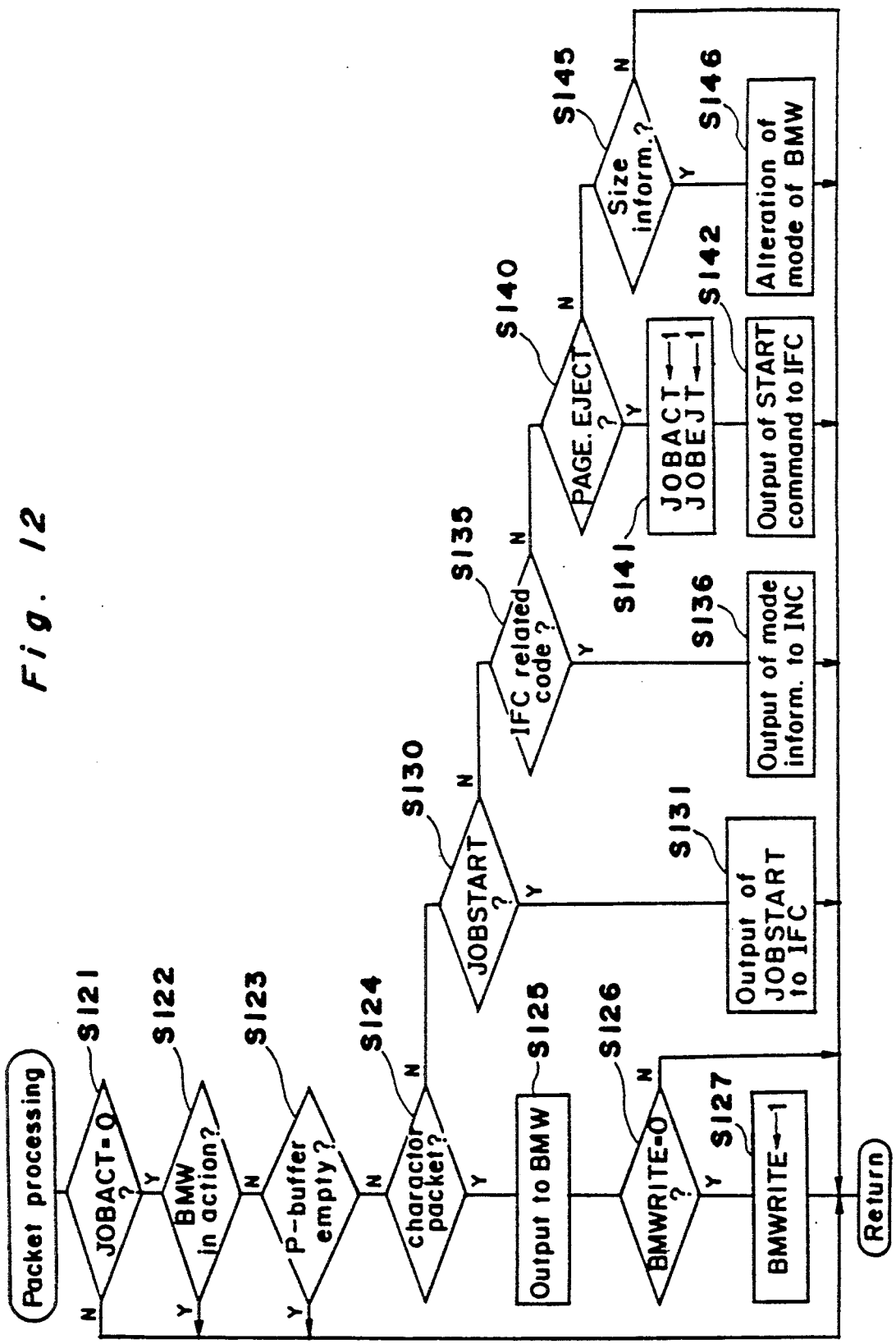
FIG. 12 is a flow chart of the packet processing subroutine to be executed in the main routine.

FIG. 12 shows a flow chart of the packed processing S11 for processing packets stored in the P-buffer 305.

The packets include packets for characters to be printed and controlling packets. Since the BM-RAM 32 can not be renewed before the print of the latest image is completed, any processing is not done in the print state (JOBACT=1, namely NO at step S121).

Also, in the case that there is no packet in the P-buffer, namely the p-buffer is empty (YES at step 123), any processing is not executed.

In the case of a character packet (YES at step S124), it is outputed to the bit map writer 31 at step S125. The bit map writer 31 analyzes the packet and images the font pattern corresponding to the font address on the BM-RAM 32 using the font memory 33. Since it is impossible to process the next packet during the processing of the present packet, the process returns directly.

In the case of the first character packet (BMWRITE=0; YES at step S126), the BMWRITE flag is set at step S127.

If the packet is one of controlling packets other than character packets (NO at step S124) and if it is the JOB-START code for indicating the start of print action (YES at step S130), it is outputted to the IFC at step S131.

If it is an IFC related code (YES at step S135), it is outputted to the IFC at step S136. The IFC related codes are used for indicating a number of multi-prints a designation of a paper supplying cassette and/or action modes of accessaries.

If it is a PAGE.EJECT (YES at step S140) indicating a partition between successive pages, images on the BM-RAM 32 having been imaged before the PAGE.EJECT are outputted to print out. In order for that, at first, the JOBACT flag is set to inhibit the imaging onto the BM-RAM 32 thereafter and the JOBEJT flag for requesting the start of print is set at step S141. The latter flag is checked in the print sequence processing shown in FIG. 13. Then, the print command PRNCMD is outputted to the IFC 40 and further the START command is outputted to the IFC 40 in order to request the start of the print engine 4 at step S142.

The JOBEJT is acknowledged in the print sequence processing and then reset at step S165. But, the JOBACT is reset by a command (not shown) sent from the IFC 40 when the copying process by the print engine has been completed.

In the case of the size information (YES at step S145), it is outputted to the bit map writer 31 in order to alter the mode for imaging font patterns on the BM-RAM 32 by the bit map writer 31 at step S146. In this mode alteration the volume of memory per one-image line is altered.

Print sequence processing

Figure 13:
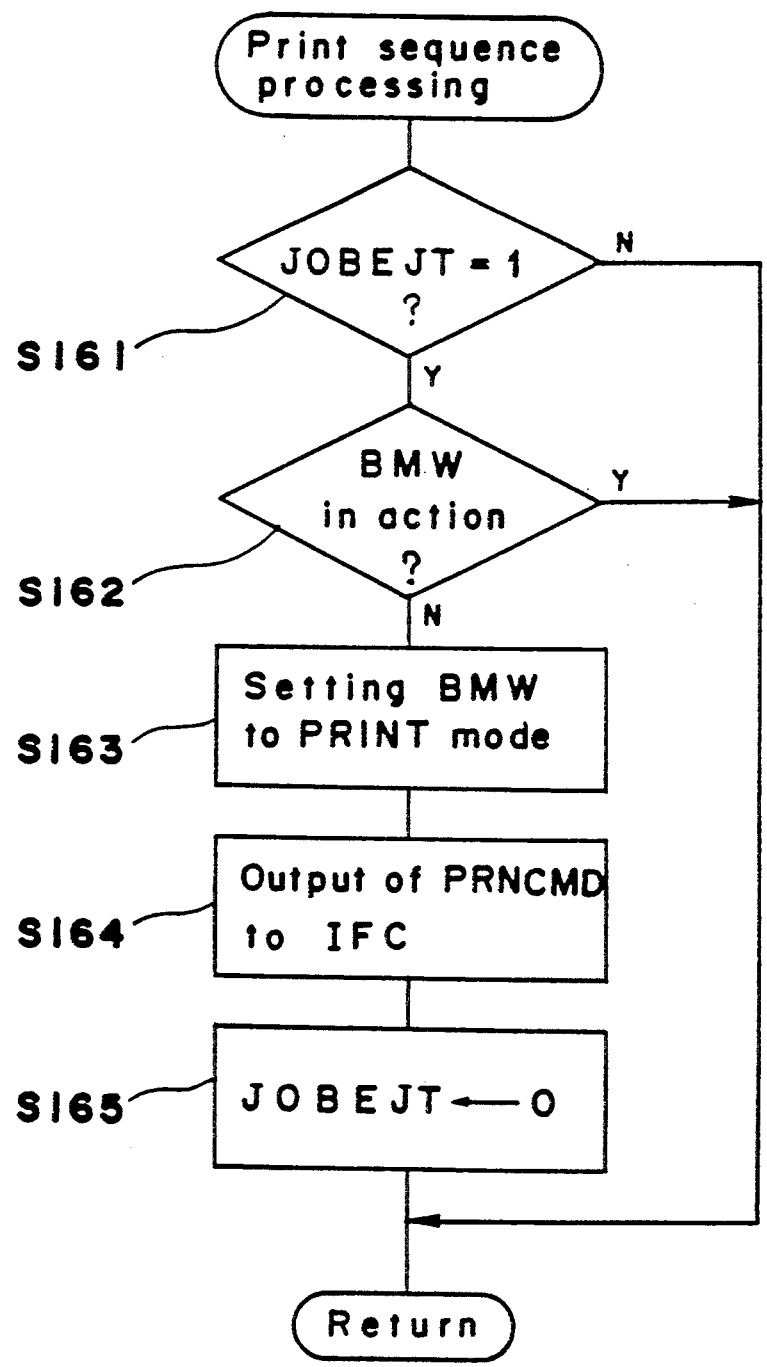
FIG. 13 is a flow chart of the print sequence processing subroutine to be executed in the main routine.

FIG. 13 shows a flow chart of the print sequence processing for starting the print action responsive to the JOB control flag (JOBEJT) and according to the state of the bit map writer 31.

The start of print action is done when it is requested by the JOBEJT (YES at step S161; JOBEJT=1). But, it is inhibitted during the processing of the last package by the bit map writer 31 (NO at step S162).

If it is possible, the bit map writer 31 is switched to the print mode at step S163 and then, a PRNCMD for requesting the start of exposure to the IFC 40 is outputted at step S164. Thereafter, the JOBEJT flag is reset at step 165.

Cassette selection processing

FIG. 14 is a flow chart of the cassette selection processing.

The cassette selection becomes effective only at the beginning of each page namely before receiving print data (LPWRITE=0 at step S181). This is intended to guarantee a layout of a pre-edited image. In order to designate a cassette, there are provided a designation mode due to the paper size and a designation mode due to the position of cassette. If both designation modes to be set coincide with the latest designation modes, the processing is omitted (YES at step S183 and at step S186).

In the case of size designation (YES at step S182), a cassette corresponding to the designated paper size is searched in the cassette information memorized at step S184. If it is found out at step S185, it is checked whether or not copy papers are contained in the cassette at step S188 and then, renewal processing from step S189 to step S192 is done.

In the case of cassette position designation (NO at step S182), it is checked whether or not the corresponding cassette is mounted at step S186. Then, the state of the cassette is checked at step S187. If it is available at step S188, the process goes to step S189. Simultaneously, it is checked whether or not the designation command is processed correctly and the result of the check is noticed to all external data processors. If it is processed correctly, ACK processing is done at step S193 (See FIG. 17). If it is not NAK processing is done at step S194 (See FIG. 18).

Font selection

FIG. 15 shows a flow chart for the font selection processing.

At first, the attribute of the designated font at step S202. If the corresponding font is found out (YES at step S203), the font in use is renewed at step S204, and, thereafter, the ACK processing is performed at step S205. If there is no corresponding font, the NAK processing is performed at step S206.

Reset processing

Figure 16:
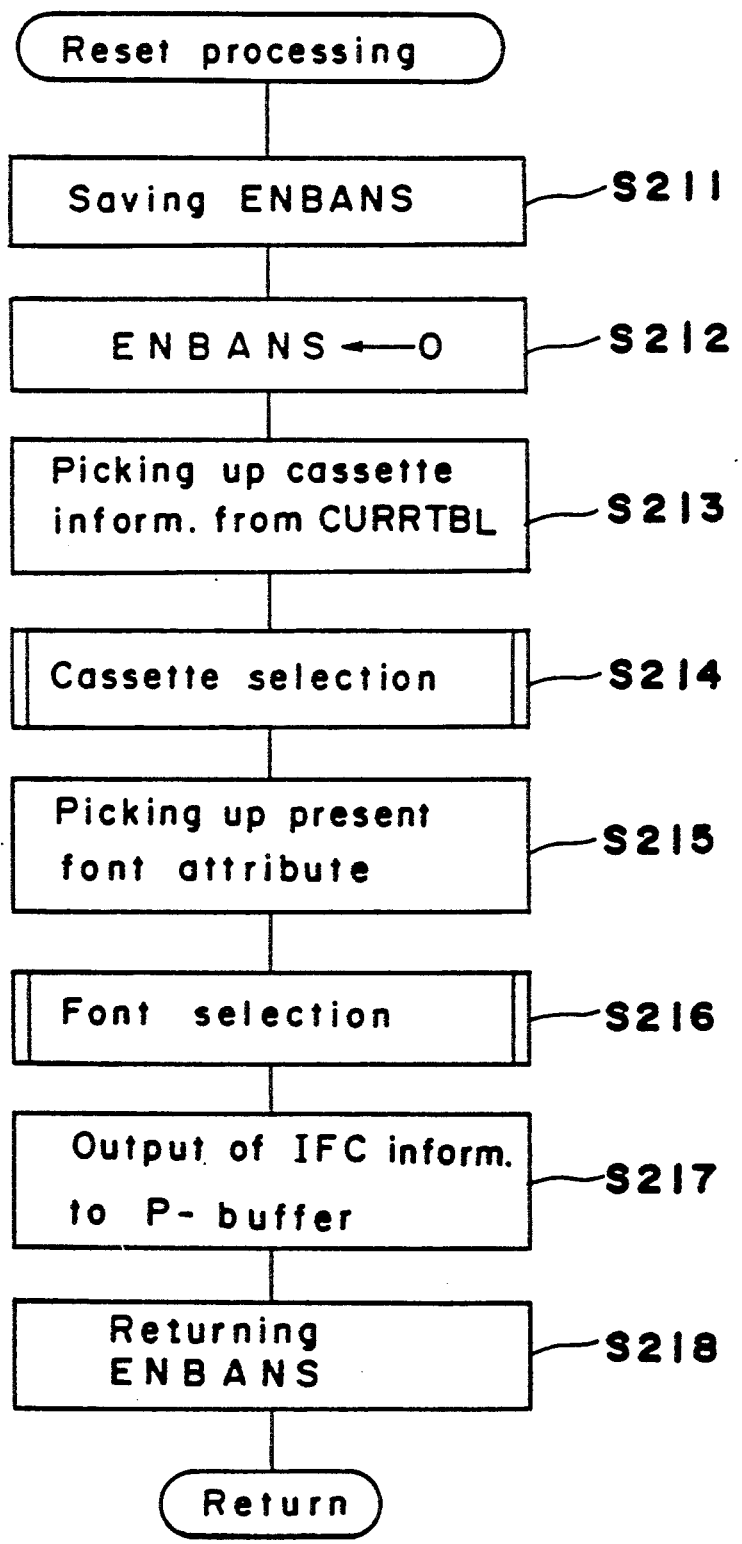
FIG. 16 is a flow chart of the reset processing subroutine to be executed in the subroutine shown in FIG. 10(b)

FIG. 16 shows a flow chart of the reset processing. The reset processing is provided for resetting the print engine to the latest state thereof after setting the print engine once for a new user.

The reset processing is executed in a manner similar to that used in the processing for designation from an ordinary data processor. However, since the processing includes a message transmission to the data processors, the present ENBANS flag is saved and then, reset at zero to inhibit the transmission temporaly at steps S211 and S212 in order to prevent unnecessary message transmission to individual data processors.

Next, set values regarding the cassette are read out from the CURRTBL at step S213 and the cassette selection processing is executed at step S214.

Similarly, the font attribute is read out from the CURRTBL at step S215 and the font selection processing is executed at step S216. Further, the present IFC related information is directly outputted to the P-buffer 305 at step S217 and finally, the saved ENBANS flag is returned at step S218.

ACK and NAK processings

Figure 18:
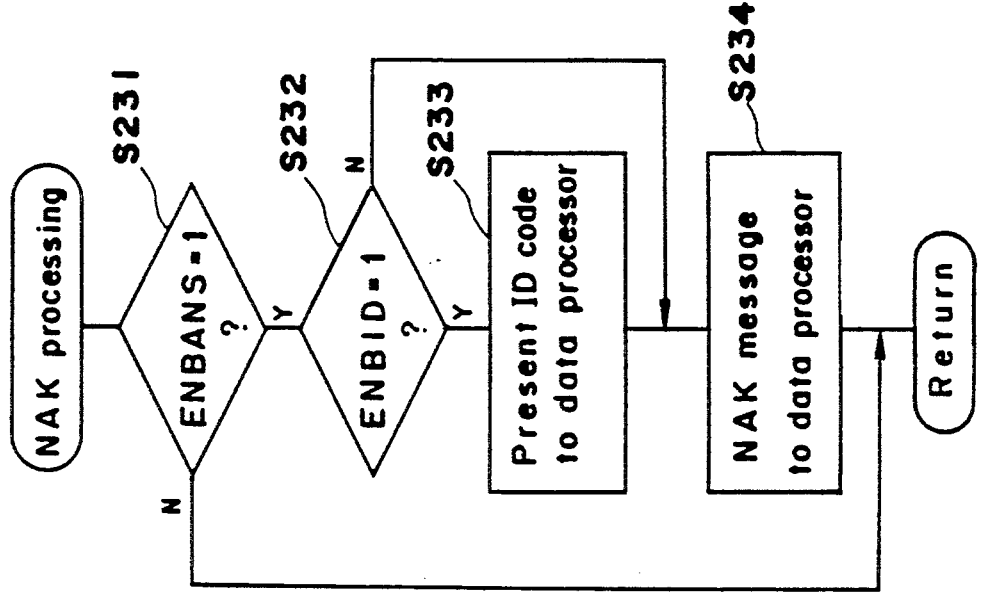
FIG. 18 is a flow chart of the NAK processing subroutine to be executed in the subroutine shown in FIG. 15.
Figure 17:
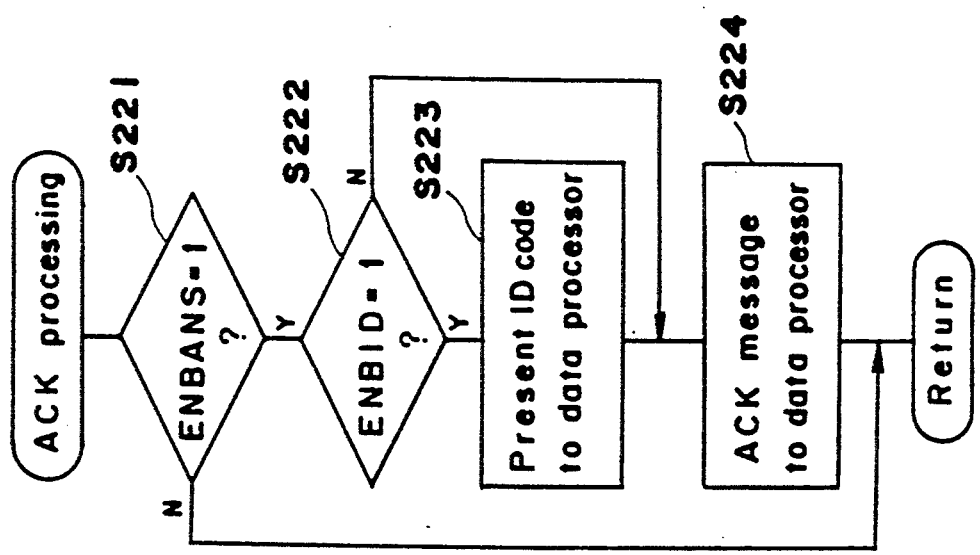
FIG. 17 is a flow chart of the ACK processing subroutine to be executed in the subroutine shown in FIG. 15.

FIGS. 17 and 18 show flow charts of the ACK processing for noticing that the processing is done correctly and the NAK processing for noticing the processing is not done correctly.

Both processings are executed only when the ENBANS flag is set at one (YES at steps S221 or S231). When the ENBID flag becomes one at step S223 or S233, namely, the ID mode is set, respective ID codes are sent to corresponding data processors at first (at step S223 or S233). Next, an ACK message in the case of the ACK processing or an NAK message in the case of the NAK processing is sent to the corresponding data processor (at step S224 or S234).

Data receipt interruption

Figure 19:
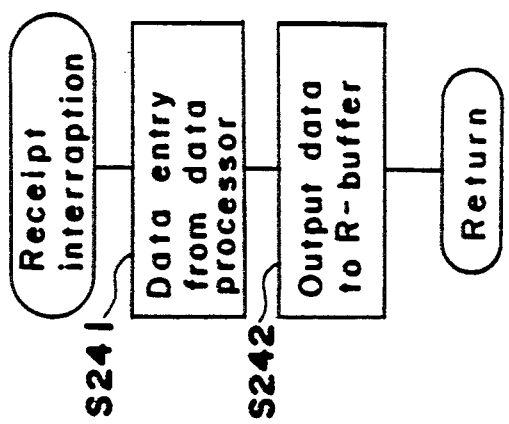
FIG. 19 is a flow chart of the data receipt interruption.

FIG. 19 shows a flow chart of the data receipt interruption for processing an interruption request from the data processor interface 308.

Namely, when data are entered from the data processor via the file-multiplex-buffer 2 at step S241, they are stored in the R-buffer 304 temporally at step S242.

RAM font processing

Figure 20A:
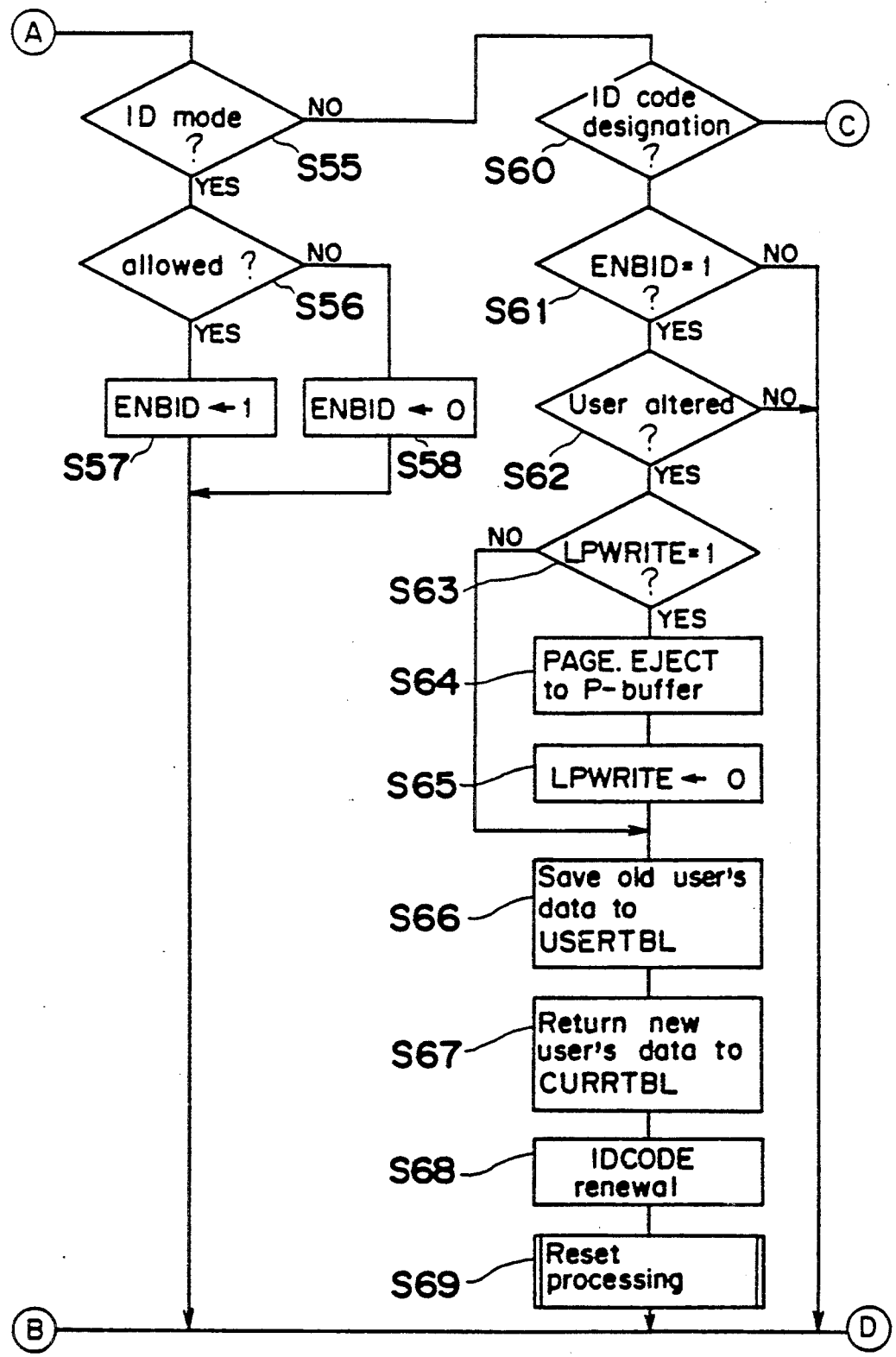
FIGS. 20(a) and 20(b) are a flow chart showing a variation from the flow chart shown in FIG. 10 (b)
Figure 20B:
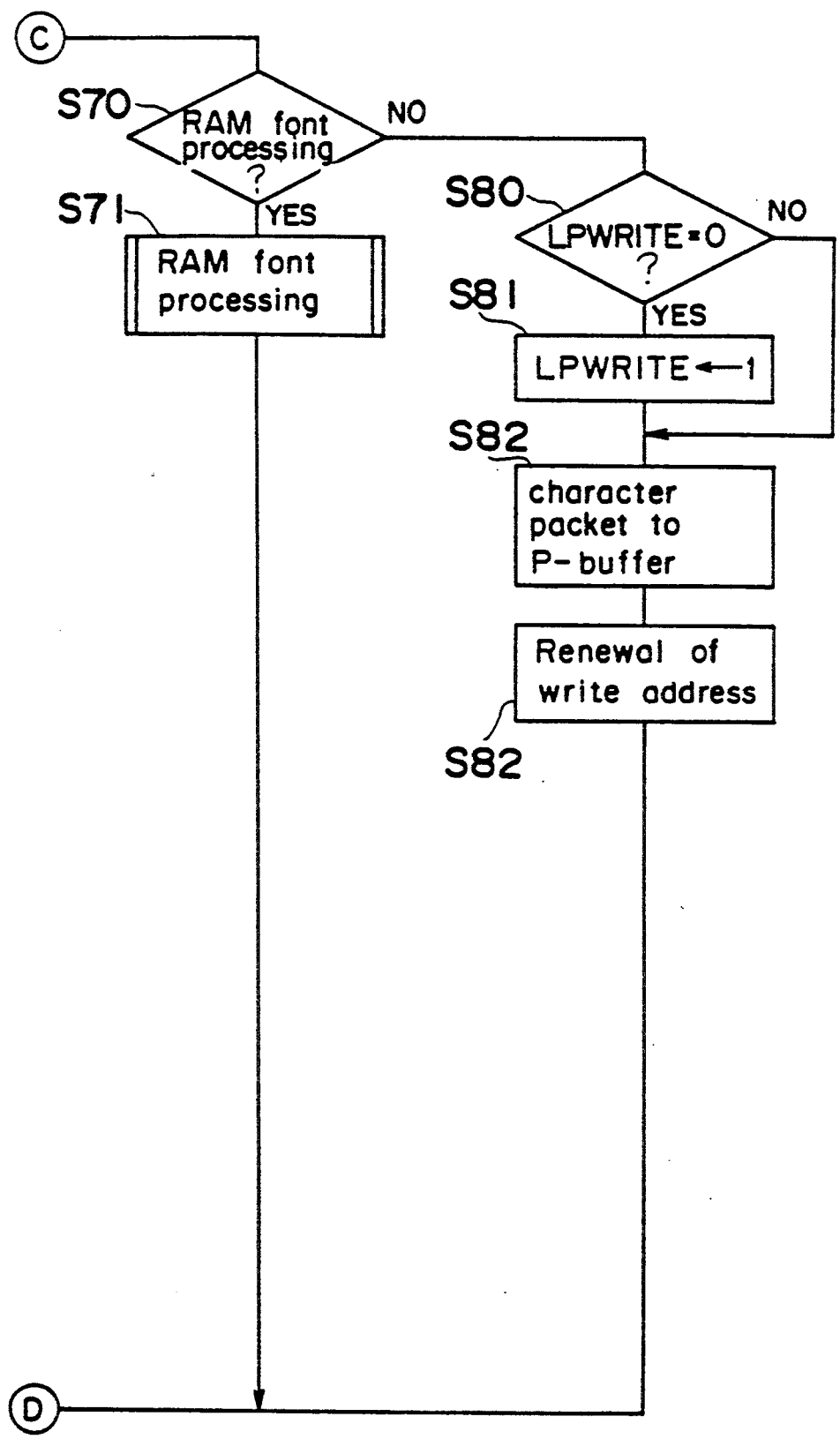

FIGS. 20(a) and 20(b) show a variation of the flow chart of FIG. 10(b).

In this variation, the RAM font processing is newly added, as is apparent from comparison of FIGS. 20(a) and 20(b) with FIG. 10(b).

If the read code indicates the RAM font processing at step S70, it is executed at step S71. This is provided for managing the RAM section of the font memory by down-leading font data and/or deleting font data downloaded.

Other processings shown in FIGS. 20(a) and 20(b) are substantially same to those shown in FIG. 10(b).

Figure 21A:
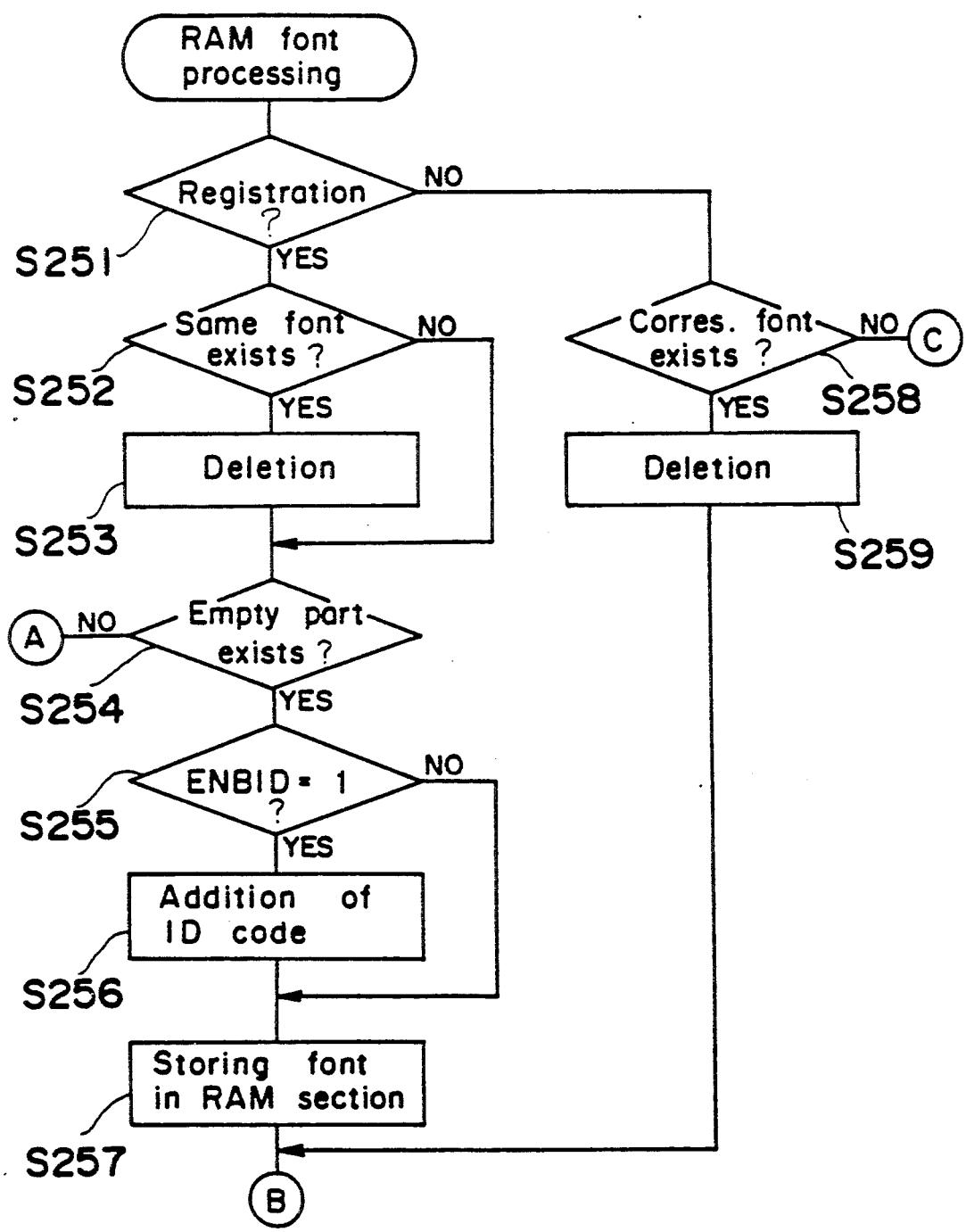
FIGS. 21(a) and 21(b) are a flow chart of the RAM font processing subroutine to be executed in the subroutine shown in FIGS. 20(a) and 20(b)
Figure 21B:
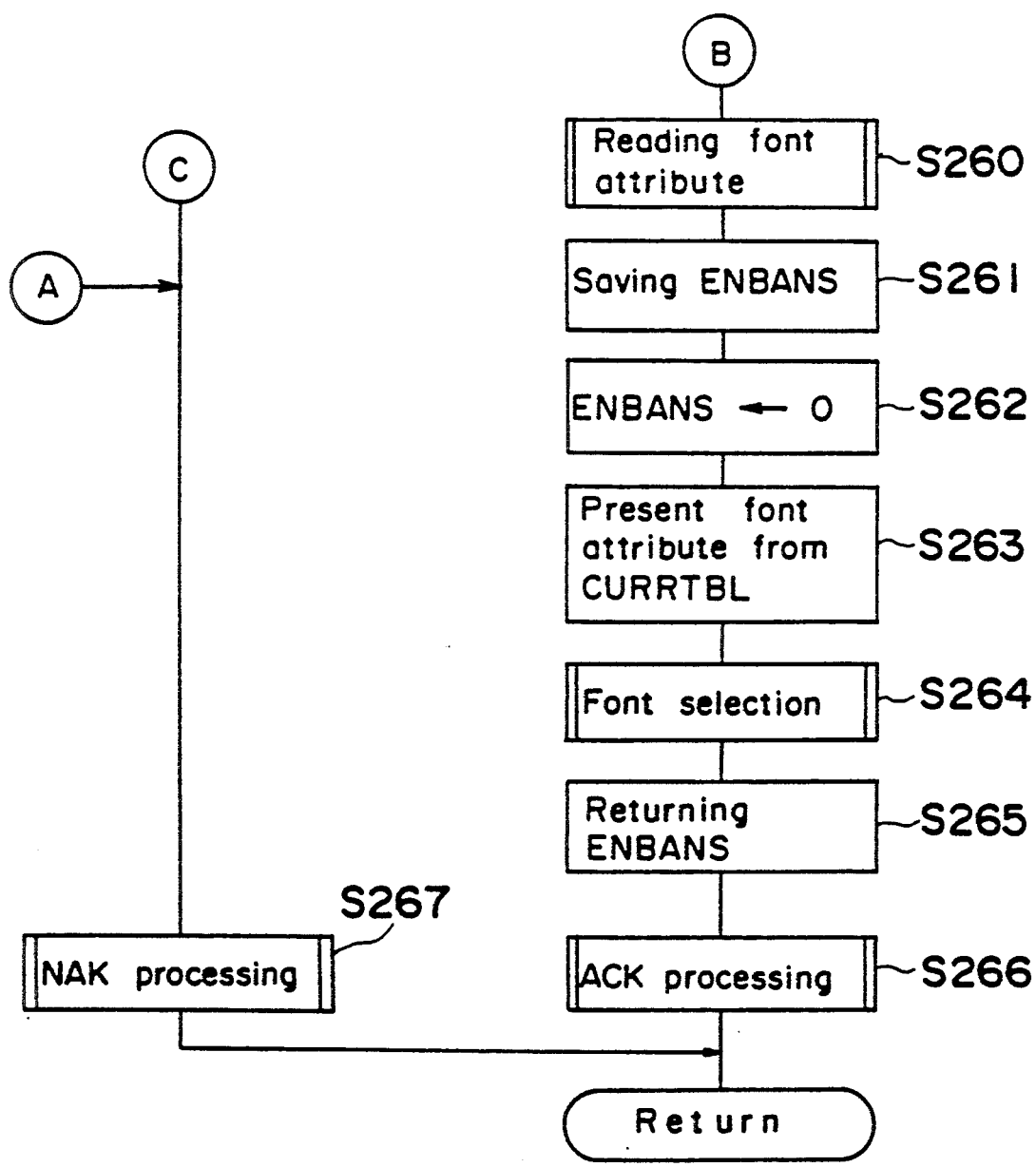

FIGS. 21(a) and 21(b) show a flow chart of the RAM font processing.

This processing includes registration (down-loading) of font data and deletion of down-loaded font data.

In the case of font registration (YES at step S251), the font set information of the CURRTBL is searched in order to check whether or not the same font has been registered already using the font attribute at step S252. If it has been already registered, the font set information is initialized and the font attribute information is deleted from the RAM section of the font memory at step S253. If it has not been registered (NO at step S252), the process goes directly to step S254.

At step S254, it is checked whether or not a blank area for registering the font exists in the RAM section. If NO at step S254, the NAK processing is done at step S267. If YES thereat and the ENBID flag indication the ID mode is set at one (YES at step S255), the corresponding ID code is added to the area provided for the font attributes at step 256.

If the mode is not set in the ID mode (NO at step S255), the font attribute, pattern position information (address information) and font patterns are registered into the RAM section at step S257.

When the registration has been completed, renewal of the font set information and re-selection of the font to be used ar done through steps from S260 to S266.

Figure 22:
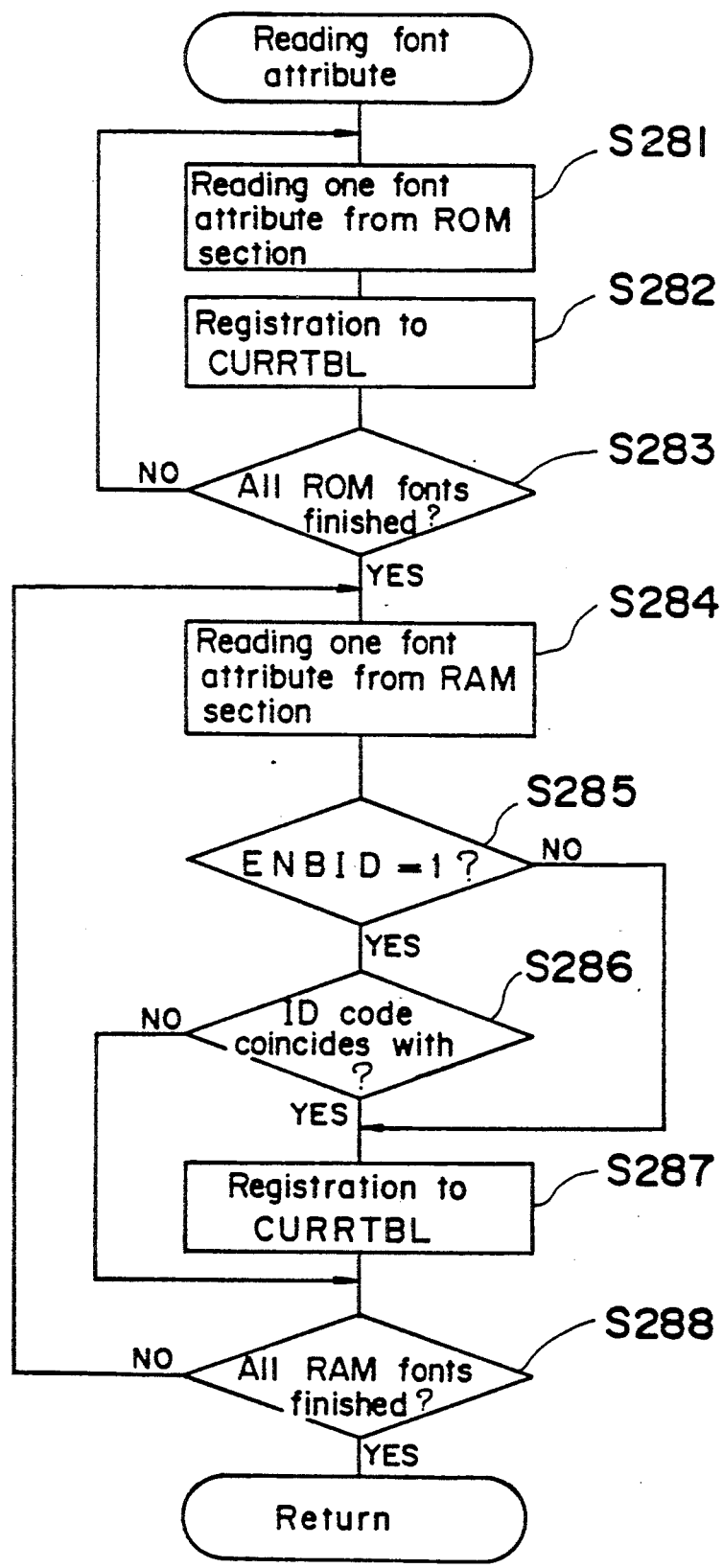
FIG. 22 is a flow chart of the font attribute reading subroutine to be executed in the subroutine shown in FIGS. 21(a) and 21(b).

At step S260, the font set information in the CURRTBL is renewed by reading out the font attribute (see FIG. 22). Next, the ENBANS flag is saved at step S261 and reset at step S262 in order to prevent unnecessary message from outputting.

Then, the present font attribute of the CURRTBL is read out in order to re-select the font to be used at step S263 and the font selection processing corresponding to the ID code at step S264. Thereafter, the ENBANS flag is returned at step S265 and the ACK processing is done at step S266.

In the case of deletion of font (NO at step S251), if the corresponding font exists already (YES at step S258), the font is deleted at step S259. Then, renewal of the font set information and re-selection of the font to be used are executed similarly to the case of registration. If the font to be deleted is not found out (NO at step S258), the NAK processing is executed at step S267.

Reading of font attribute

FIG. 22 shows a flow chart of the processing for reading out the font attribute from the font memory 33 and for storing it as the font set information in the CURRTBL.

At first, all font attributes stored in the ROM section are read out one by one and registered into the CURRTBL through steps from S281 to S283.

With respect to the RAM section, font attributes are read one by one. However, if the ID mode is designated (YES at step S285), only the font attribute having the same ID code (YES at step S286) is registered in the CURRTBL at step S287. If the ID mode is not designated (NO at step S285), all fonts of the RAM section are registered into the CURRTBL.

Thus, at least one font to be used by every user is registered as the font set information in the CURRTBL according to the ID code.

It is to be noted that the present invention is not limitted to the preferred embodiment mentioned above.

For instance, it is not necessary to transform received data into packets. Also, plural ID codes can be assigned to one host machine when shared with plural users. Further, although the USERTBL and the CURRTBL are provided for preventing the print mode from destroying or changing due to change of users and for speeding up the processing speed, they may be omitted.

Still further, although down-loaded fonts are explained in the present preferred embodiment, the present invention is not limitted thereto. For example, the present invention is applicable to print data such as over-laying form which is down-loaded from an external host machine with respect to every user.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. Printer controller for controlling a printer being connectable to plural host machines and/or terminals, comprising:

communication means for communicating data with said plural host machines and/or terminals, said data including print data to be printed, control data for controlling printing action of the print data and an identification code assigned to each of said plural host machines and/or terminals;

memory means for memorizing said identification code;

print control means for controlling the printing action of the print data responsive to the control data; and response control means for vesting said identification code memorized in said memory means to a response to be transmitted to one of said plural host machines and/or terminals to which said identification code assigned and for outputting the response including the identification code vested thereto through said communication means.

2. Printer controller as claimed in claim 1, wherein said response control means includes means for determining whether or not an identification code should be vested in accordance with contents of the response to be transmitted.

3. Printer controller as claimed in claim 1, wherein said response control means includes means for determining whether an identification code should be vested or a common code should be vested to all of said plural host machines and/or terminals in accordance with contents of the response to be transmitted.

4. Printer controller for controlling a printer being connectable with plural host machines and/or terminals, comprising:

bi-directional communication means for receiving print data, an identification code assigned to each host machine and/or terminal and control data including set values of printing modes used for printing the print data, and for outputting data selectively to each host machine and/or terminal;

memory means for memorizing the identification code received;

print control means for controlling said printer for printing the print data according to the set value of the printing mode received;

response means for providing a response in accordance with a present state of said printer controlled by said print control means; and communication control means for controlling said bi-directional communication means so as to output said response provided by said response means together with said identification code memorized in said memory means.

5. Printer controller as claimed in claim 1, wherein the control data include paper cassette selection data.

6. Printer controller as claimed in claim 1, wherein the control data include font selection data.

7. Printer controller as claimed in claim 4, wherein the set value of the printing mode includes a paper cassette selecting indication.

8. Printer controller as claimed in claim 4, wherein the set value of the printing mode includes a font selecting indication.

* * * * *